US012265641B1

(12) United States Patent
Sommer et al.

(10) Patent No.: US 12,265,641 B1
(45) Date of Patent: Apr. 1, 2025

(54) DETECTING OUT-OF-BAND SCREEN CAPTURES AND RECORDINGS

(71) Applicant: Amazon Technologies, Inc., Seattle, WA (US)

(72) Inventors: Matthew Michael Sommer, Issaquah, WA (US); Bruce Sherrod, Oakland, CA (US); Maciej Broda, Ottawa (CA); Laura Jane Hayward, Letchworth Garden City (GB); Joe Stapleton, Norfolk (GB)

(73) Assignee: Amazon Technologies, Inc., Seattle, WA (US)

( * ) Notice: Subject to any disclaimer, the term of this patent is extended or adjusted under 35 U.S.C. 154(b) by 216 days.

(21) Appl. No.: 17/957,776

(22) Filed: Sep. 30, 2022

(51) Int. Cl.
*G06F 21/62* (2013.01)

(52) U.S. Cl.
CPC ................................ *G06F 21/6218* (2013.01)

(58) Field of Classification Search
CPC ............... G06Q 30/0202; G06Q 40/04; G06Q 10/0637; G06Q 10/067; G06Q 30/0201; G06Q 30/0205; G06Q 40/06; G06Q 40/08; G06N 5/04; G06N 7/005; G06N 99/005; H04L 63/1425; H04L 63/1441; H04L 63/0861; H04L 43/04; H04L 63/205; G06F 21/6218
USPC .......... 726/28, 2, 21, 36; 713/150, 163, 181; 380/255, 264, 276
See application file for complete search history.

(56) References Cited

U.S. PATENT DOCUMENTS

| | | | | |
|---|---|---|---|---|
| 6,256,544 B1* | 7/2001 | Weissinger | ........ | G05B 19/0421 700/1 |
| 6,931,549 B1* | 8/2005 | Ananda | ................ | H04L 9/3297 713/169 |
| 7,093,130 B1* | 8/2006 | Kobayashi | .............. | H04L 63/12 713/168 |
| 7,171,515 B2* | 1/2007 | Ohta | ..................... | G06F 12/127 711/E12.076 |
| 7,530,105 B2* | 5/2009 | Gilbert | ................ | H04L 63/1425 709/227 |
| 8,661,080 B2* | 2/2014 | Bortnikov | ............... | G06F 9/542 709/224 |

(Continued)

OTHER PUBLICATIONS

Apple Support, "Scan a QR code with your iPhone, iPad, or iPod touch," www.support.apple.com, Apple, Inc., Copyright 2022, 2 pages, URL: https://support.apple.com/en-us/HT208843, obtained on Sep. 30, 2022.

(Continued)

*Primary Examiner* — Sharif E Ullah
(74) *Attorney, Agent, or Firm* — Athorus, PLLC

(57) ABSTRACT

Captures or recordings of sensitive information or data displayed on screens or displays are detected by generating unique identifiers of users and embedding linked codes including such identifiers into the information or data. When the information or data is accessed by a user and displayed on a screen, and an image of the information or data is captured by a camera of a mobile device or other system, the camera detects a code within the images and requests to access a page or other networked resource associated with a link embedded in the code. Upon detecting a request to access such a page, the request may be attributed to the user. Upon detecting a unique identifier within an image depicting sensitive information, the image may be attributed to the user.

20 Claims, 16 Drawing Sheets

(56) References Cited

U.S. PATENT DOCUMENTS

| | | | | |
|---|---|---|---|---|
| 8,832,840 | B2* | 9/2014 | Zhu | G06F 21/577 726/25 |
| 9,256,735 | B2* | 2/2016 | Stute | H04L 63/1425 |
| 9,548,956 | B2* | 1/2017 | Brauff | H04L 51/066 |
| 9,560,065 | B2* | 1/2017 | Neil | H04L 63/1425 |
| 9,729,829 | B2* | 8/2017 | Eyal | H04N 21/816 |
| 10,075,394 | B2* | 9/2018 | Vobbilisetty | H04L 45/66 |
| 10,216,485 | B2* | 2/2019 | Misra | H04L 67/10 |
| 11,050,572 | B2* | 6/2021 | Steele | H04L 9/3239 |
| 2005/0000165 | A1* | 1/2005 | Dischinat | E06B 7/23 49/496.1 |
| 2007/0204219 | A1* | 8/2007 | Foulger | G06F 16/954 715/234 |
| 2007/0226796 | A1* | 9/2007 | Gilbert | G06F 21/577 726/25 |
| 2008/0178284 | A1* | 7/2008 | Harwell | G11B 20/00855 726/21 |
| 2013/0111592 | A1* | 5/2013 | Zhu | G06F 21/577 726/25 |
| 2013/0117852 | A1* | 5/2013 | Stute | H04L 63/1425 726/23 |
| 2014/0359552 | A1* | 12/2014 | Misra | H04L 67/12 717/100 |
| 2015/0020199 | A1* | 1/2015 | Neil | H04L 63/1408 726/23 |
| 2015/0215153 | A1* | 7/2015 | Andrews | H04L 41/0836 709/223 |
| 2016/0006629 | A1* | 1/2016 | Ianakiev | G06F 21/85 709/224 |
| 2016/0275123 | A1* | 9/2016 | Lin | G06F 9/5083 |
| 2017/0111247 | A1* | 4/2017 | Uchiyama | G06F 3/1229 |
| 2020/0156120 | A1* | 5/2020 | Amano | G16H 40/20 |
| 2022/0138843 | A1* | 5/2022 | Lounegov | G06Q 20/10 705/35 |
| 2023/0336359 | A1* | 10/2023 | Kemp | H04L 63/0428 |

OTHER PUBLICATIONS

Browserleaks, "BrowserLeaks.com," www.browserleaks.com, BrowserLeaks, Copyright 2011-2022, 2 pages, URL: https://browserleaks.com/, obtained on Sep. 30, 2022.

Browserleaks, "ClientRects Fingerprinting," www.browserleaks.com, BrowserLeaks, Copyright 2011-2022, 2 pages, URL: https://browserleaks.com/rects, obtained on Sep. 30, 2022.

Browserleaks, "HTML5 Canvas Fingerprinting," www.browserleaks.com, BrowserLeaks, Copyright 2011-2022, 2 pages, URL: https://browserleaks.com/canvas, obtained on Sep. 30, 2022.

Currie, Daniel L., III and Cynthia E. Irvine, "Surmounting the Effects of Lossy Compression on Steganography," Proceedings of the 19th National Information Systems Security Conference, URL: https://csrc.nist.gov/csrc/media/publications/conference-paper/1996/10/22/proceedings-of-the-19th-nissc-1996/documents/paper014/stegox.pdf, 8 pages.

Delgado, Carlos, "Top 5: Best Image Color Extraction JavaScript and jQuery Plugins," www.ourcodeworld.com, Our Code World, 6 pages, Mar. 4, 2017, URL: https://ourcodeworld.com/articles/read/403/top-5-best-image-color-extraction-javascript-and-jquery-plugins, obtained on Sep. 30, 2022.

Deng, Sway, "imgcolr," www.github.com, GitHub, Inc., 7 pages, Nov. 4, 2013, URL: https://github.com/swaydeng/imgcolr, obtained on Sep. 30, 2022.

Gonzalez, Brian, "RGBASTER," www.github.com, GitHub, Inc., 4 pages, Dec. 19, 2019, URL: https://github.com/briangonzalez/rgbaster.js, obtained on Sep. 30, 2022.

Google Developers, "Barcode scanning," www.developers.google.com, Google Developers, 3 pages, Sep. 29, 2022, URL: https://developers.google.com/ml-kit/vision/barcode-scanning, obtained on Sep. 30, 2022.

Jariz, "Vibarnt.js," www.github.com, GitHub, Inc., 3 pages, Nov. 28, 2017, URL: http://github.com/jariz/vibrant.js/, obtained on Sep. 30, 2022.

Lokesh, "Color Thief," www.github.com, GitHub, Inc., 4 pages, Jul. 5, 2020, URL: https://github.com/lokesh/color-thief/, obtained on Sep. 30, 2022.

Lukyvj, "Colorify.js," www.github.com, GitHub, Inc., 13 pages, Apr. 2, 2021, URL: https://github.com/LukyVj/Colorify.is, obtained on Sep. 30, 2022.

Mun, Sang, "The ZXX Font," zxx.vero.moe, Sang Mun, Copyright 2013, 2 pages, Oct. 1, 2013, URL: https://zxx.vero.moe/, obtained on Sep. 30, 2022.

Random, "How to watermark/overlay image on an html?," www.stackoverflow.com, Stack Exchange, Inc., 2, pages, Mar. 29, 2012, URL: https://stackoverflow.com/questions/9935161/how-to-watermark-overlay-image-on-an-html-page, obtained on Sep. 30, 2022.

Uma, "How can I recover stenographically hidden data from a photographic copy of the image?," www.security.stackexchange.com, Stack Exchange, Inc., 9 pages, Jan. 9, 2020, URL: https://security.stackexchange.com/questions/223890/how-can-i-recover-steganographically-hidden-data-from-a-photographic-copy-of-the-image, obtained on Sep. 30, 2022.

Wikipedia, "Counterfeit," www.wikipedia.com, Wikipedia: The Free Encyclopedia, 9 pages, Aug. 1, 2022, URL: https://en.wikipedia.org/wiki/Counterfeit#Anti-counterfeiting_technologies, obtained on Sep. 30, 2022.

Wikipedia, "Fourier transform," www.wikipedia.com, Wikipedia: The Free Encyclopedia, 36 pages, Sep. 24, 2022, URL: https://en.wikipedia.org/wiki/Fourier_transform, obtained on Sep. 30, 2022.

Wikipedia, "ISO 22381:2018," www.wikipedia.com, Wikipedia: The Free Encyclopedia, 3 pages, Mar. 15, 2022, URL: https://en.wikipedia.org/wiki/ISO_22381, obtained on Sep. 30, 2022.

* cited by examiner

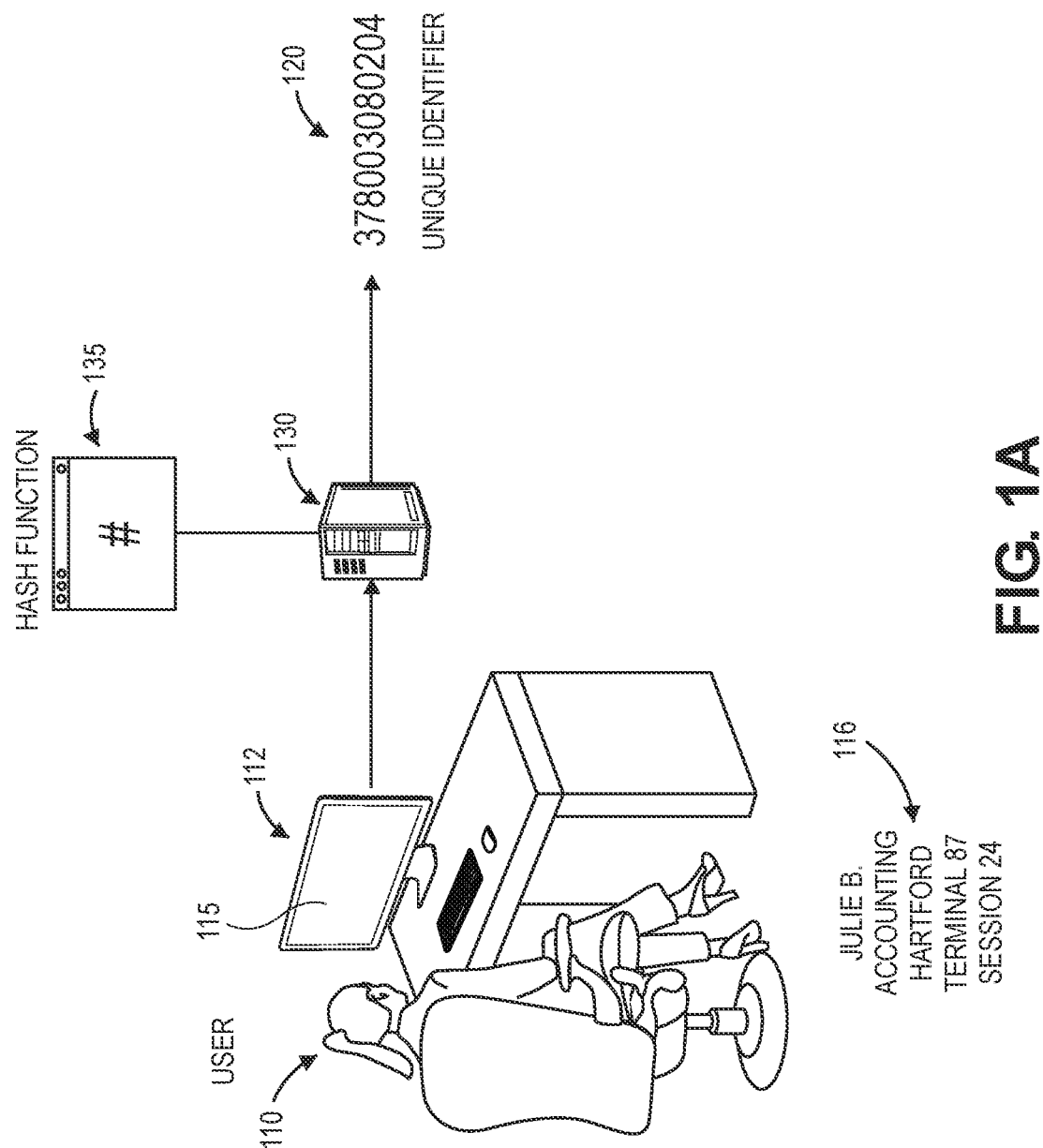

570

BANK STATEMENTS

575-1 → ACCOUNT NAME: Joseph Thorn
575-2 → ACCOUNT NUMBER: 1693

DEPOSITS

| | | |
|---|---|---|
| 09/10 | Charlie | $805 |
| 09/10 | Austin | $155 |
| 09/11 | Caedon | $310 |

575-3

WITHDRAWALS

| | | |
|---|---|---|
| 09/09 | Brady | $1,216 |
| 09/12 | Colin | $190 |
| 09/13 | Dominic | $440 |

575-4

575-5 → BALANCE         $60,011.10

FIG. 5A

DETECTING OUT-OF-BAND SCREEN CAPTURES AND RECORDINGS

BACKGROUND

Traditional techniques for protecting sensitive information or data from unauthorized disclosure or use have focused on inhibiting or restricting access to systems on which the sensitive information or data is stored. Breaches of information security or unauthorized access to sensitive information or data are typically detected by identifying when the information or data is retrieved from such systems, either directly or via other systems, and by whom. If sensitive information or data is accessed only by users or devices that are so authorized, and never transferred to other systems, then access to the sensitive information or data may be controlled by restricting access to only such users or only such devices.

Today, as mobile devices and other camera-equipped personal devices or systems have become more prevalent over time, a new threat to information security has emerged. When sensitive information or data is displayed on a screen, a user of a mobile device or another camera-equipped system may capture or record images of the sensitive information or data on the screen, either individually or in series (e.g., a video) and electronically abscond with the sensitive information or data without ever identifying themselves as having access to the sensitive information or data, and without requesting permission to transfer the sensitive information or data from one device to another in advance. Images of sensitive information or data may be processed, e.g., for character recognition or for any other purpose, or converted from one form to another, before being whisked away to other devices or systems by electronic mail, cloud sharing, text messages, social media, or in any other manner.

Camera-equipped devices or systems thus pose a risk to sensitive information or data that is unknowable in scope, for the use of such devices or systems in a surreptitious manner is largely undetectable and unstoppable by conventional security measures. As the levels of quality and levels of resolution of cameras improve, and as the network connectivity of such devices or systems is enhanced, the risk is compounded. Currently, the only way to ensure that sensitive information or data displayed on screens is not subject to capture or recording by camera-equipped devices or systems is to prevent such devices or systems from being located near such screens, an increasingly difficult task as such devices or systems decrease in size.

BRIEF DESCRIPTION OF THE DRAWINGS

FIGS. 1A through 1H are views of aspects of one system or process for detecting screen captures or recordings in accordance with implementations of the present disclosure.

FIGS. 5A and 5B are views of aspects of one system or process for detecting screen captures or recordings in accordance with implementations of the present disclosure.

DETAILED DESCRIPTION

As is set forth in greater detail below, the present disclosure is directed to systems and methods for detecting screen captures or recordings of sensitive information or data, e.g., by "out-of-band" systems, such as mobile devices or other personal devices that are equipped with one or more cameras. More specifically, the systems and methods of the present disclosure are directed to generating unique identifiers of users and incorporating watermarks or visual identifiers (e.g., bar codes) representing the unique identifiers into documents containing sensitive information or data in various locations. In some implementations, the watermarks or visual identifiers may be or include links to networked resources that specifically include unique identifiers of users. When an image of a document containing sensitive information or data and one or more of the watermarks or visual identifiers is captured by an out-of-band system, or a system disconnected from or independent of systems on which the sensitive information or data is maintained, the image may be processed to detect and decode a watermark or a visual identifier by one or more applications operating on the out-of-band system. Upon detecting the watermark or the visual identifier, the out-of-band system may initiate a request for the networked resource, and the request may be directly attributed to the user for whom the unique identifier embodied in the watermark or the visual identifier was generated. Additionally, after an image of a document containing sensitive information or data and one or more of the watermarks or visual identifiers has been captured and posted, shared or stored in one or more social media accounts or other virtual or physical locations, the image may be processed to search for and identify or locate any watermarks or virtual identifiers therein. Upon detecting the watermark or the visual identifier, the posted, shared or stored image may be directly attributed to the user for whom the unique identifier embodied in the watermark or the visual identifier was generated.

The unique identifier may be incorporated into documents containing sensitive information or data in any manner. In some implementations, a watermark or a bar code (or another visual identifier) including the unique identifier may be directly incorporated into such documents, e.g., by inserting passages of code referencing the watermark or the bar code into such documents, or by overlaying the watermark or the bar code over such documents in any color, such as black-and-white, or one or more colors selected from a color palette determined from a document. Alternatively, a watermark or a bar code may be steganographically encoded into an image included in a document containing sensitive information, and the watermark or the bar code may be detected within an image captured of the document.

Figure 1B:
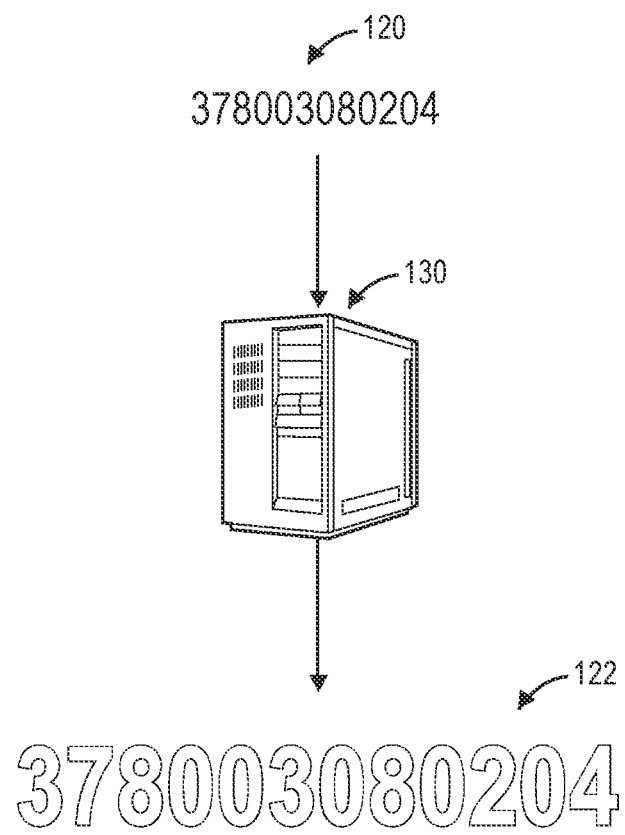

Referring to FIG. 1A through 1H, views of aspects of a system or process for detecting screen captures or recordings in accordance with embodiments of the present disclosure are shown. As is shown in FIG. 1A, an authorized user 110 operates a computer 112 (e.g., a terminal or workstation) that is connected to a secure storage facility 130 over one or more networks. One or more attributes 116 (or other identifying information) of the authorized user 110, e.g., a name of the authorized user 110, a title or position of the authorized user 110, a city or other location identifier of the authorized user 110, a number or identifier of the computer 112, and a number or an identifier of a session during which the authorized user 110 operates the computer 112 to access the secure storage facility 130 are shown.

The computer 112 may be any type or form of general purpose or special purpose computer machine, such as a desktop computer, a terminal or a workstation, having a display 115. Alternatively, the computer 112 may be a laptop computer, a tablet computer, a computer associated with a large monitor or television, or any other computer device or system. The display 115 may be a monitor, a television, or any other like machine having a screen for viewing rendered video content. In some implementations, the display 115 may be a capacitive touchscreen, a resistive touchscreen, or any other system for receiving interactions by the authorized user 110.

The secure storage facility 130 may be any computer device or system for storing information or data thereon, and may include any number of servers, processors, data stores or other components. The secure storage facility 130 may require a predetermined level of clearance, authorization or permission to access the sensitive information or data, e.g., following an entry of a passcode, a password, an identifier, a credential, or any other authenticating information or data. The secure storage facility 130 may maintain or execute one or more enhanced security measures or features (e.g., physical or virtual) that are required in order to ensure that the information or data is stored thereon at a higher level of security or with greater confidence, and may include one or more monitoring systems for tracking and recording access to the secure storage facility 130, or attempts to access the secure storage facility 130.

The computer 112 or any other computers (not shown) may connect to the secure storage facility 130 in any wired or wireless manner, and over any number of networks, which may include the Internet in whole or in part.

A unique identifier 120 of the authorized user 110 may be generated based on the attributes 116. For example, as is shown in FIG. 1A, the attributes 116 may be provided to a hash function 135 executed by the secure storage facility 130, e.g., a cryptographic function that generates the unique identifier 120 in the form of a one-way hash from one or more of the attributes 116 or any other information or data regarding the authorized user 110, the computer 112, or the session during which the authorized user 110 operates the computer 112.

In some implementations, the unique identifier 120 of the authorized user 110 may be generated by combining one or more of the attributes 116 into a string that complies with one or more standards for inclusion in a uniform resource identifier ("URI") or uniform resource locator ("URL") before being provided to the hash function 135. A string including all or portions of the attributes 116 may be stripped of spaces, punctuation marks or other symbols, or converted to the American Standard Code for Information Interchange ("ASCII") before being provided to the hash function 135. For example, where one of the attributes 116 is a name of the computer 112 such as "Julie's Computer," the name of the computer 112 may be condensed to juliescomputer. Alternatively, the attributes 116 may be provided directly to the hash function 135 without any modification.

As is shown in FIG. 1B, the secure storage facility 130 may generate a watermark 122 based on the unique identifier 120. In some implementations, the watermark 122 may be entirely or partially transparent, and may be rendered in a selected font in one or more documents containing sensitive information or data that is stored on the secure storage facility. For example, the watermark 122 may be rendered in a font that may preserve privacy of the unique identifier, or may be resistant to character recognition, e.g., an open source font, a font such as ZXX, or any other font.

Figure 1C:
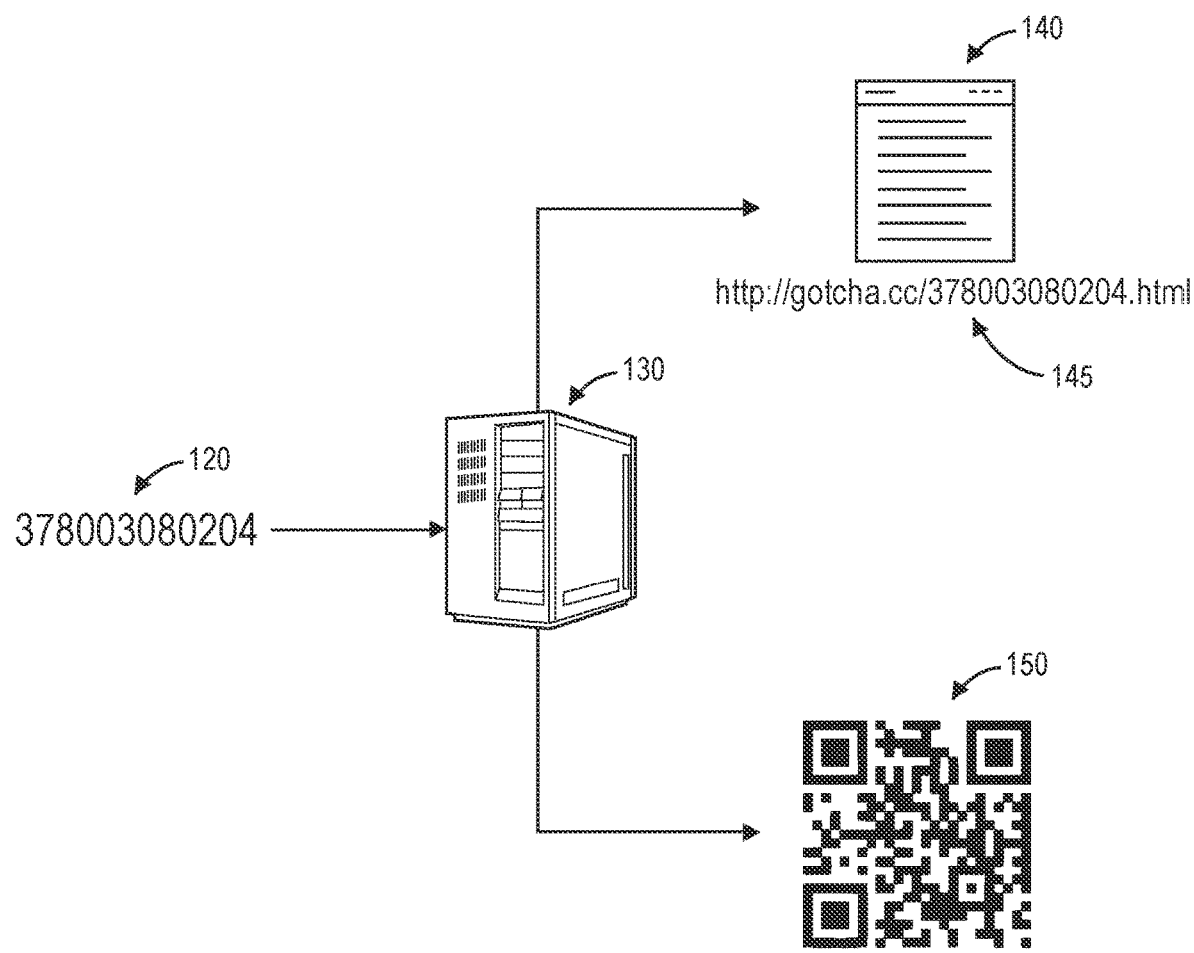

Additionally, as is shown in FIG. 1C, the unique identifier 120 may be incorporated into a resource locator 145 (e.g., a URI or a URL) of a networked resource 140 hosted on the secure storage facility 130 or another computer device or system. The resource locator 145 may be a fully qualified domain name, viz., a host name and a domain name, that includes the unique identifier 120. Alternatively, the resource locator 145 may include the unique identifier 120 in a subdirectory or file name associated with a fully qualified domain name. Moreover, the networked resource 140 may be configured to return a response code indicating that a request for the networked resource 140, e.g., based on the resource locator 145, has been successful. Once the resource locator 145 has been generated, the resource locator 145 may be encoded into a visual identifier 150 such as a bar code or another representation that may, when visually captured and interpreted by a camera or another imaging device, be decoded to identify the link and request the networked resource 140.

In some implementations, the visual identifier 150 may be a one-dimensional bar code, a two-dimensional bar code, a bokode or any other form of coded representations of information or data. In some implementations, the visual identifier 150 may include one or more alphanumeric characters or symbols.

Figure 1D:
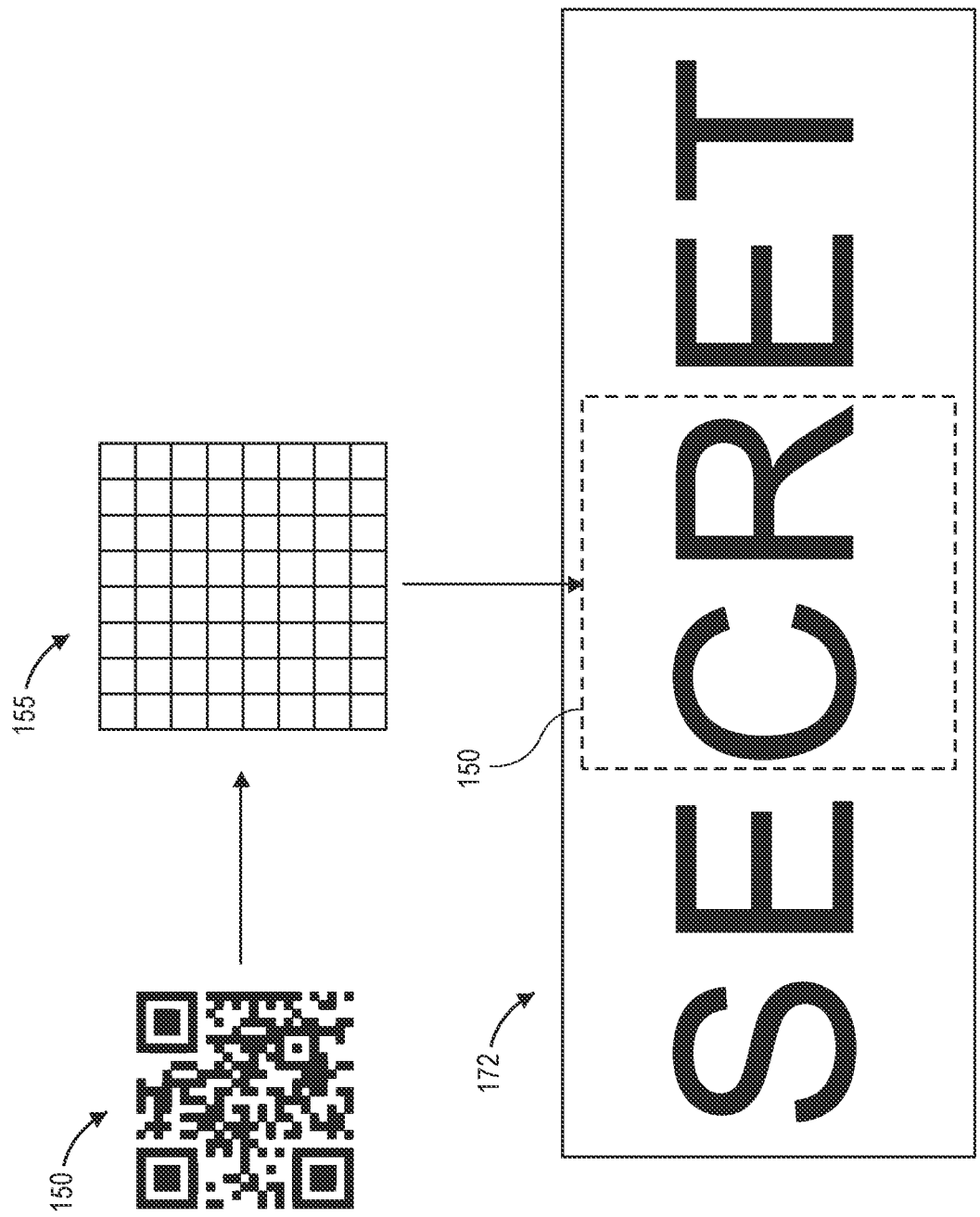

As is shown in FIG. 1D, the visual identifier 150 may be steganographically encoded into a visual image 172 that is sufficiently sized to accommodate the visual identifier 150 and regions of pixels of the visual image 172 may be steganographically altered to create an appropriate level of contrast between them. For example, one or more portions of the visual image 172 corresponding to locations of dark bars or sections of the visual identifier 150 may be modified by converting values of less significant bits to create a slightly darker color within the visual image 172, while one or more other portions of the visual image 172 corresponding to locations of light bars or sections of the visual identifier 150 may be modified by converting values of the less significant bits to create a slightly lighter color within the visual image 172.

Based on the visual identifier 150, an array 155 of corresponding sections or segments including amounts or extents to which pixels within such sections or segments must be steganographically modified in order to encode the visual identifier 150 into the visual image 172 may be determined on any basis, including but not limited to the characteristics or qualities of the representative pixels to be modified, as well as minimum or maximum thresholds for detectability or invisibility, or any other factor. For example, the array may identify sections or segments corresponding to darkened (or black) areas of the visual identifier 150, for which pixel values should be increased by a value of +n (e.g., in binary or decimal, according to a hexadecimal model or any other model). The array 155 may also identify sections or segments corresponding to lightened (or white) areas of the visual identifier 150, for which pixel values should be decreased by a value of −n.

By selectively altering pixels within adjacent sections of the visual image 172, a version of the visual identifier 150 that is imperceptible to humans but may be readily discerned by imaging devices may be embedded into the visual image 172 thereby.

Figure 1E:
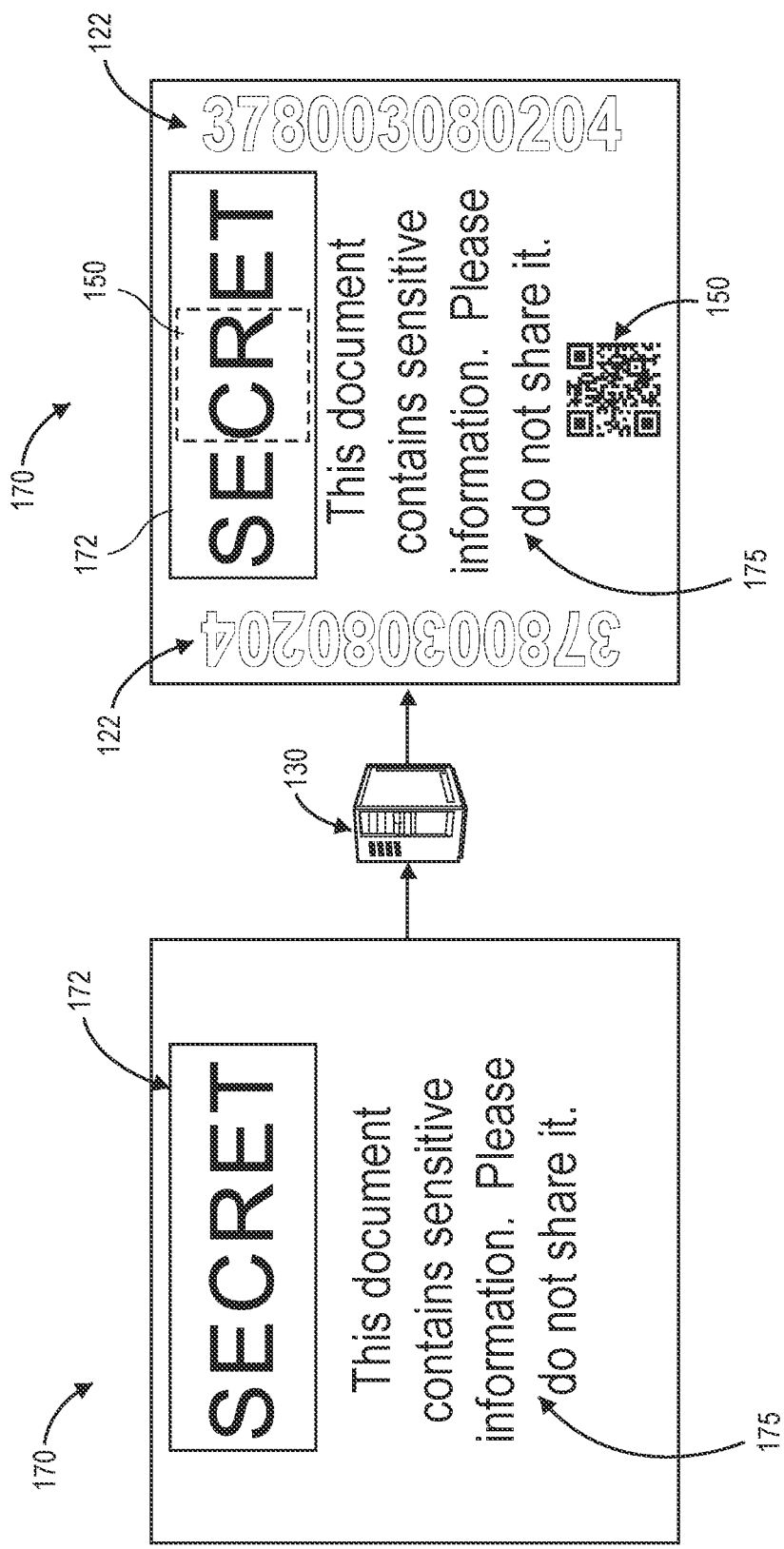

As is shown in FIG. 1E, the watermark 122 and the visual identifier 150 may be incorporated into a document 170 containing sensitive information 175. The document 170 may be any type or form of document for rendering information or data in a visible format, such as a document rendered by a browser (e.g., a network page), a document presented by a document sharing service, or any other document generated by or using a word processor, a data management application, or any other application. For example, where the document 170 includes the visual image 172 and a set of text representing at least some of the sensitive information 175, the secure storage facility 130 may embed the watermark 122 within the document 170. In some implementations, where the document 170 is written in a language such as hypertext markup language ("HTML"), the watermark 122 may be incorporated into the document 170 by one or more elements, such as a <div> element or tag, which defines a division or a section of an HTML document for grouping similar sets of content, or may contain one or more other elements or tags which may then be styled according to a style sheet, or a <frame> or <frameset> element, which divide a user interface of a browser into multiple windows or sections, any of which may load a separate HTML document or set of information or data. Alternatively, the watermark 122 may be incorporated into the document 170 by a method or element which permits a shape to be generated within an HTML document, such as Recto, and may then be styled according to a style sheet. The watermark 122, or any other watermarks that may uniquely identify the authorized user 110 and be attributed to that authorized user 110, may be embedded in the document 170 or any other documents containing sensitive information or data in accordance with implementations of the present disclosure.

The secure storage facility 130 may also embed the visual identifier 150 into the document 170 in any manner. For example, as is shown in FIG. 1E, when a visual identifier 150 is embedded into the visual image 172, the visual image 172 may be incorporated into the document 170 in one or more locations, e.g., in a header of the document 170, such as is shown in FIG. 1E, or a margin or footer of the document 170, or elsewhere within the document 170. The visual identifier 150 may also be incorporated directly into the document 170, e.g., by one or more elements or tags representing the visual identifier 150, in a footer of the document 170, such as is shown in FIG. 1E, or elsewhere. Alternatively, the visual image 172 or the visual identifier 150 may be overlaid onto the document 170 by a browser or another application in accordance with a style sheet or in any other manner.

In some implementations, the visual identifier 150 may be incorporated into the document 170 and rendered in black-and-white colors, to increase a likelihood that the visual identifier 150 may be detected by one or more applications that are configured to search imaging data for one or more aspects or elements of bar codes or other visual identifiers. Alternatively, the visual identifier 150 may be incorporated into the document 170 in one or more colors selected from a color palette generated for the document 170, which may be determined by one or more palette sampling techniques from a document object model or any other descriptor of or reference to the document 170.

Figure 1F:
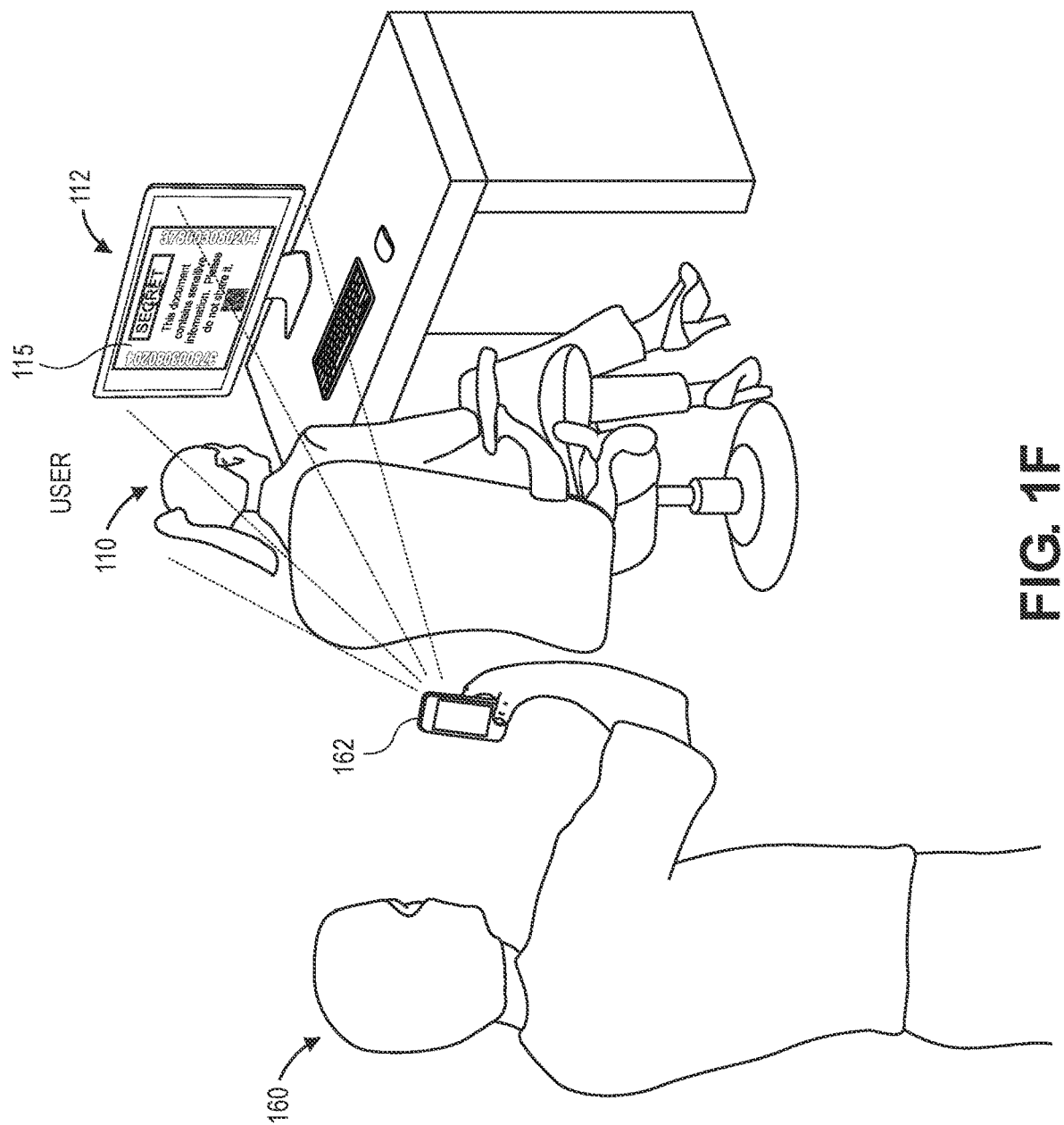

In accordance with implementations of the present disclosure, a capture or a recording of a document including sensitive information or data that is rendered on a display of a computer device may be detected in any number of ways. As is shown in FIG. 1F, an unauthorized user 160 surreptitiously captures or records one or more images of the document 170 rendered on the display 115 of the computer 112 using a mobile device 162 having one or more cameras provided thereon. The mobile device 162 may be a smartphone, a tablet computer, or any other device or system that may be relatively small in size or readily concealed by the unauthorized user 160, e.g., in a pocket of the unauthorized user 160, or in any other location or any other manner.

As is shown in FIG. 1F, the unauthorized user 160 captures or records images using the mobile device 162 from a position outside of a field of view of the authorized user 110, and presumably without the knowledge of the authorized user 110. Alternatively, in some implementations, the authorized user 110 may capture an image of the document 170 on the display 115 using a mobile device or another device or system, such as the mobile device 162, without having the authority to do so.

Figure 1G:
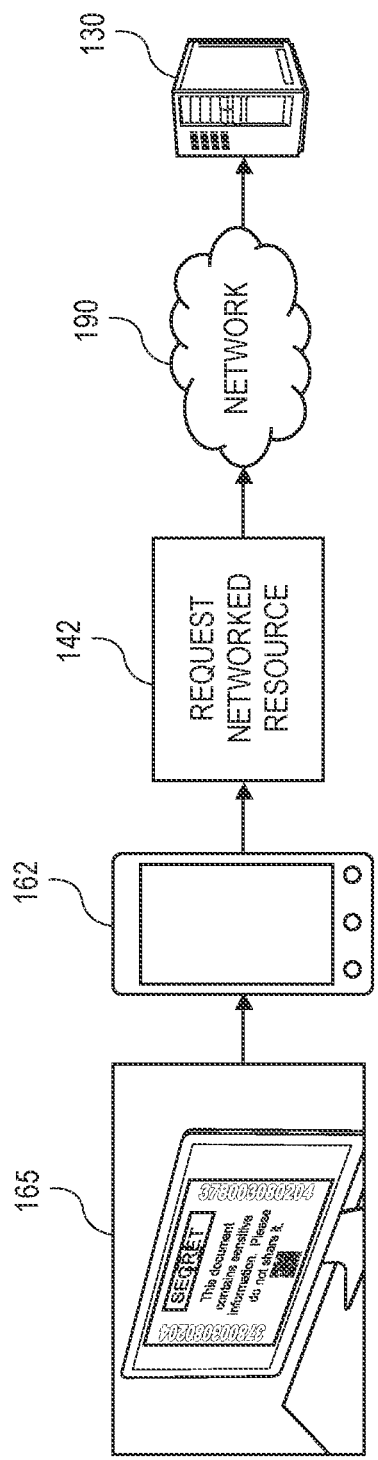

As is shown in FIG. 1G, one or more images 165 captured or recorded by the mobile device 162 are processed to recognize one or more of the watermark 122 or the visual identifier 150 depicted therein. In some implementations, the mobile device 162 may be programmed to automatically search imaging data captured thereby, e.g., the images 165, for visual identifiers such as bar codes, and also to localize the visual identifiers, such as by identifying parallel line patterns, or squares or other shapes, and matching the line patterns or shapes to one or more templates corresponding to one of a plurality of visual identifiers. The visual identifiers detected therein may be decoded to identify any text, numbers or other information or data encoded therein.

Thus, as is shown in FIG. 1G, when the mobile device 162 captures the images 165, detects the watermark 122 or the visual identifier 150 therein, the mobile device 162 decodes the watermark 122 or the visual identifier 150 to identify the resource locator 145 (e.g., the link) to the networked resource 140 depicted therein. The mobile device 162 then transmits a request 142 for the networked resource 140 over the one or more networks 190 to the secure storage facility 130. In some implementations, the request 142 may include any number of attributes of the mobile device 162 or any other information or data.

In some implementations, where the images 165 are posted, shared or stored in one or more external locations after having been captured by the unauthorized user 160, the images 165 may be attributed to the user 110 based on the watermark 122. For example, images that are posted to social media platforms, shared via electronic mail or other messaging techniques, or stored in files on one or more data stores, the posts, the messages or the files may be processed to determine whether such files include any watermarks, and, upon identifying the watermark 122 in the images 165, the images 165 may be attributed to the user 110.

Figure 1H:
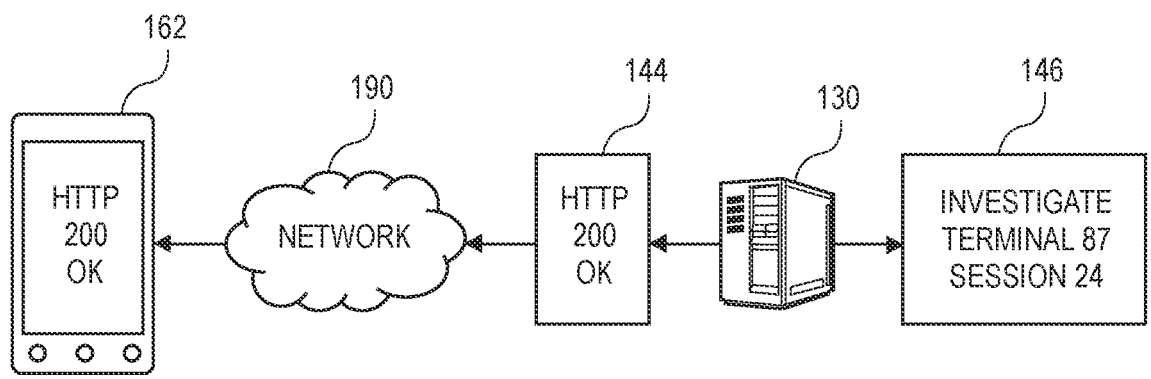

As is shown in FIG. 1H, in response to the request 142, the secure storage facility 130 returns a response 144 to the mobile device 162. The response 144 may include a response code or another indicator that the request 142 was successful. In some implementations, the response 144 may include a response code, such as an HTTP Status Code 200 ("OK"), which indicates that the request 142 has been processed successfully and, optionally, a Domain Name System "A" record for the networked resource. Alternatively, the response 144 may include any other code, which may be selected based on or tailored to the request 142, which may be directly attributed to at least the user 110 based on the host name and/or domain name.

Additionally, and also in response to the request 142, the secure storage facility 130 may also initiate an investigation 146 of the user 110, the computer 112, or any other attribute of a session during which the user 110 viewed the document 170 containing the sensitive information 175 using the computer 112. For example, the secure storage facility 130 may identify one or more logs or records of personnel who were known or believed to be present within a vicinity of the computer 112 at a time of the request 142. Alternatively, the secure storage facility 130 may activate one or more cameras (not shown) in or around the computer 112, or retrieve any security footage that may be captured using such cameras, and identify any personnel who are present within a vicinity of the computer 112 at a time of the request 142 or during the session. The secure storage facility 130 may also deactivate or terminate access of the user 110, recommend an interview with the user 110, or take any other action to determine whether or who captured the images 165 from which the request 142 originated. In some other implementations, the secure storage facility 130 may automatically initiate a report identifying the request 142, e.g., by a time or date of the request 142, as well as the user 110 or the computer 112, or the document 170 displayed thereon.

Accordingly, the systems and methods of the present disclosure may determine that images of documents containing sensitive information or data have been captured by embedding watermarks or visual identifiers into the documents, or overlaying the watermarks or visual identifiers over the documents. Relying on natural tendencies or capacities of mobile devices or other camera-equipped components to detect the watermarks or the visual identifiers within images captured thereby, the watermarks or the visual identifiers may be encoded with links or other resource locators or identifiers that, when detected and decoded by the mobile devices or other camera-equipped components, may be used to initiate a request for a networked resource. Where the watermarks or visual identifiers are directly attributable to a user, the request for the network resource may be tied to the user. Additionally, the watermarks or visual identifiers may be detected within images that were previously captured and posted, shared or stored, and such images may be tied to the user upon identifying the watermarks or visual identifiers.

Although FIGS. 1F and 1G depict the capture of the images 165 by the unauthorized user 160, viz., a user not authorized to view the sensitive information 175, those of ordinary skill in the pertinent arts will recognize that the images 165 may be captured by a mobile device or other camera-equipped system of the authorized user 110. For example, where the authorized user 110 is authorized to view the sensitive information 175 on the computer 112, but not on any other devices or systems, or is not authorized to share the sensitive information 175 with anyone else, and the authorized user 110 captures or records images 165 of the document 170 using a device other than the computer 112, that device may interpret the watermark 122 or the visual identifiers 150 detected therein, and initiate the request 142 for the networked resource 140 accordingly. Alternatively, images that have been posted, shared or stored in various locations may be processed to search for and detect the watermark 122 or the visual identifiers 150. Based on the watermark 122 or the visual identifiers 150, the request 142 may be directly attributed to the authorized user 110.

In accordance with implementations of the present disclosure, watermarks or visual identifiers (e.g., bar codes, such as one-dimensional or two-dimensional bar codes) may be steganographically encoded into visual images that are included in documents containing sensitive information or data, in a manner that renders the watermarks or visual identifiers invisible to the human eye, but readily detectable by one or more imaging devices and image processing techniques. Steganography is the art and science of sending and receiving communications in a manner that prevents their presence from being detected. The word "steganography," which literally means "covered writing" in Greek, is commonly used to describe communications techniques in which invisible or subliminal messages are hidden within digital images. A steganographic process starts by selecting content that is to be concealed, viz., a bar code or another visual identifier, and identifying portions of a base image, e.g., an image having one or more bits that may be modified to encode the content without damaging the integrity or size of the base image. Such bits, which are sometimes referred to as "least significant bits," "less significant bits," or "redundant bits," may be co-opted and replaced with data corresponding to the content to be concealed. By its very nature, steganographic conversion and storage of data within a base image necessarily reduces the clarity and resolution of the base image, to at least a very limited extent. Where the bits of the base image are properly selected, however, information or data may be concealed within a base image in a manner that is indiscernible to the human eye, and which neither increases nor decreases a total number of bits occupied by the modified base image.

Imaging data in the form of visual imaging data, or depth imaging data, may be captured using one or more imaging devices such as cameras or depth sensors. Such devices may generally operate by capturing light that is reflected from objects, and by subsequently calculating or assigning one or more quantitative values to aspects of the reflected light, e.g., pixels, generating an output based on such values, and storing such values in one or more data stores. Cameras may include one or more sensors having one or more filters associated therewith, and such sensors may detect information regarding aspects of any number of pixels of the reflected light corresponding to one or more base colors (e.g., red, green or blue) of the reflected light, or distances to objects from which the light was reflected. Such sensors may generate data files including such information, and store such data files in one or more onboard or accessible data stores (e.g., a hard drive or other like component), as well as one or more removable data stores (e.g., flash memory devices), or displayed on one or more broadcast or closed-circuit television networks, or over a computer network as the Internet.

Imaging data files that are stored in one or more data stores may be printed onto paper or other alternatives, presented on one or more computer displays, or subjected to one or more analyses, such as to identify items expressed therein. Such data files may be stored in any number of formats, including but not limited to JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective positions, fields of view or orientations. For example, a camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., zooming the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation. For example, panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some modern imaging devices may digitally or electronically adjust an image identified in a field of view, subject to one or more physical and operational constraints. For example, a camera may virtually stretch or condense the pixels of an image in order to focus or broaden the field of view of the camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of pixels, or of groups of pixels, in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color candy apple red is expressed as #D61123. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

According to some steganographic techniques, information or data may be encoded into one or more least significant bits or bytes of an image (or less significant bits or bytes of the image). For example, in a 24-bit digital image with pixels having three eight-bit channels (e.g., a red channel, a green channel and a blue channel), the available capacity for storing information in each pixel is substantial. Because each of the three eight-bit channels in a pixel may have two hundred fifty-six (i.e., two to the eighth power, $2^8$) unique values, each pixel of a three-channel 24-bit digital image may represent one of 16,777,216 (e.g., two to the eighth power cubed, $(2^8)^3$; or two hundred fifty-six cubed, $256^3$) unique colors. Therefore, some steganographic techniques operate by identifying one or more least significant bits or bytes, or less significant bits or bytes, in one or more of the channels of a pixel, and replacing one or more of such least significant bits or bytes with information or data, without causing any significant degradation of the clarity or resolution of the image.

In accordance with the present disclosure, watermarks or visual identifiers that are steganographically encoded into imaging data may be of any type or form, and may have any dimension. For example, one steganographically encoded watermark may be a set of alphanumeric characters, including one or more letters or numbers. Another steganographically encoded visual identifier may be a bar code (e.g., a one-dimensional or two-dimensional bar code, such as a QR code) that may be specifically encoded to embody or represent supplemental information or content, or a link to supplemental information or content. For example, visual imaging data may be steganographically encoded with text including the supplemental information or content itself, which may be recognized in one or more images captured from the imaging data. Furthermore, the text may embody one or more URIs or URLs associated with an external resource, e.g., a network page or other set of networked data, and such characters may be recognized and used to access the external resource. Yet another steganographically encoded visual identifier may be a polygon or other shape or symbol. Any type of information or data that may be encoded into a digital image by creating a contrast between and among pixels that may be discerned by an imaging device having one or more computer processors, but remains substantially invisible to the human eye, may act as a visual identifier in accordance with the present disclosure.

A watermark or visual identifier may be steganographically encoded into any relevant or appropriate portion of an image (e.g., a spatial location within the image). According to some embodiments of the present disclosure, representative pixels for encoding watermarks or visual identifiers may be centrally located within an image frame, e.g., generally across all or a portion of the image frame. In some other embodiments, however, the representative pixels may be located in a standard location within an image frame (e.g., a perimeter of the frame, a designated corner of the frame, or any other section of the frame), and an imaging device that captures one or more images of the frame may be configured to recognize that the image includes an outline of an image, and to search the standard location within the outline of the image for one or more watermarks or visual identifiers.

According to some embodiments of the present disclosure, representative pixels for encoding one or more watermarks or visual identifiers into a digital image may be selected according to methods or techniques that systematically evaluate pixels within the visual imaging data (e.g., color, grayscale or black-and-white pixels) and identifies and selects representative pixels for storing steganographically encoded watermarks or visual identifiers therein. For example, the representative pixels may be identified at random, or in specific locations within visual imaging data (e.g., predefined locations within the images, such as in a grid or according to a pattern, or based on a rectangular or polar coordinate system centered or based in one or more specific locations of the imaging data). Such methods or techniques may identify one or more homogenous sets or subsets of representative pixel regions or sectors (e.g., grids or groupings of pixels) of visual imaging data, one or more of which may be ultimately selected for encoding with pixels corresponding to a watermark or a visual identifier.

In some other embodiments of the present disclosure, representative pixels may be identified in locations that may be selected based on attributes of the visual imaging data. For example, representative pixels may be identified or defined within visual imaging data as a function of variations of pixel-level intensities within the visual imaging data, which may be quantitatively determined by recognizing various texture properties within the visual imaging data, comparing numerical measures of the relative intensities of pixels or textons within the visual imaging data to one another, or on any other basis. Representative pixels may be selected based on one or more repetitive patterns observed within visual imaging data, i.e., locations within the imaging data where the properties of the imaging data are constant, varying slowly, or substantially periodic in nature, and may be recognized using one or more algorithms or machine-learning tools. Any means or model for selecting representative pixels from a set of visual imaging data (e.g., a still or moving black or white, grayscale, color or depth image captured from a scene) for steganographically encoding watermarks or visual identifiers therein may be utilized in accordance with the present disclosure.

After a watermark or a visual identifier has been encoded into representative pixels of a visual imaging data file, the modified visual imaging data file may be stored in one or more data stores, and utilized for any purpose. For example, the representative pixels having the watermark or the visual identifier encoded therein may be identified from a stored modified visual imaging data file according to the same strategy by which the representative pixels were originally identified (e.g., at random, according to one or more patterns, or based on attributes of the depth information or data or the visual imaging data). The watermark or visual identifier may then be recognized and attributed to a user, or used to access supplemental information or content, e.g., directly or from an external resource, and utilized for any purpose.

Those of ordinary skill in the pertinent arts will recognize that references to a "least significant bit" herein may refer to not only lowest-valued bits of a pixel (e.g., ones-place bits) but also one or more other bits of comparatively low significance, or "less significant bits," including those bits that may immediately follow or have a next-highest significance above a lowest-valued bit in a given pixel. For example, in accordance with the present disclosure, one, two, three or more bits of a representative pixel of a visual image (e.g., a color, grayscale or black-and-white pixel) may be modified to store a watermark or a visual identifier within the visual image. Accordingly, those of ordinary skill in the pertinent arts will recognize that the term "least significant bit," as used herein, may refer to a single bit of a pixel having a lowest value of all bits in the pixel, and may also refer to two or more bits of the pixel having the lowest values of all bits in the pixel.

Figure 2:
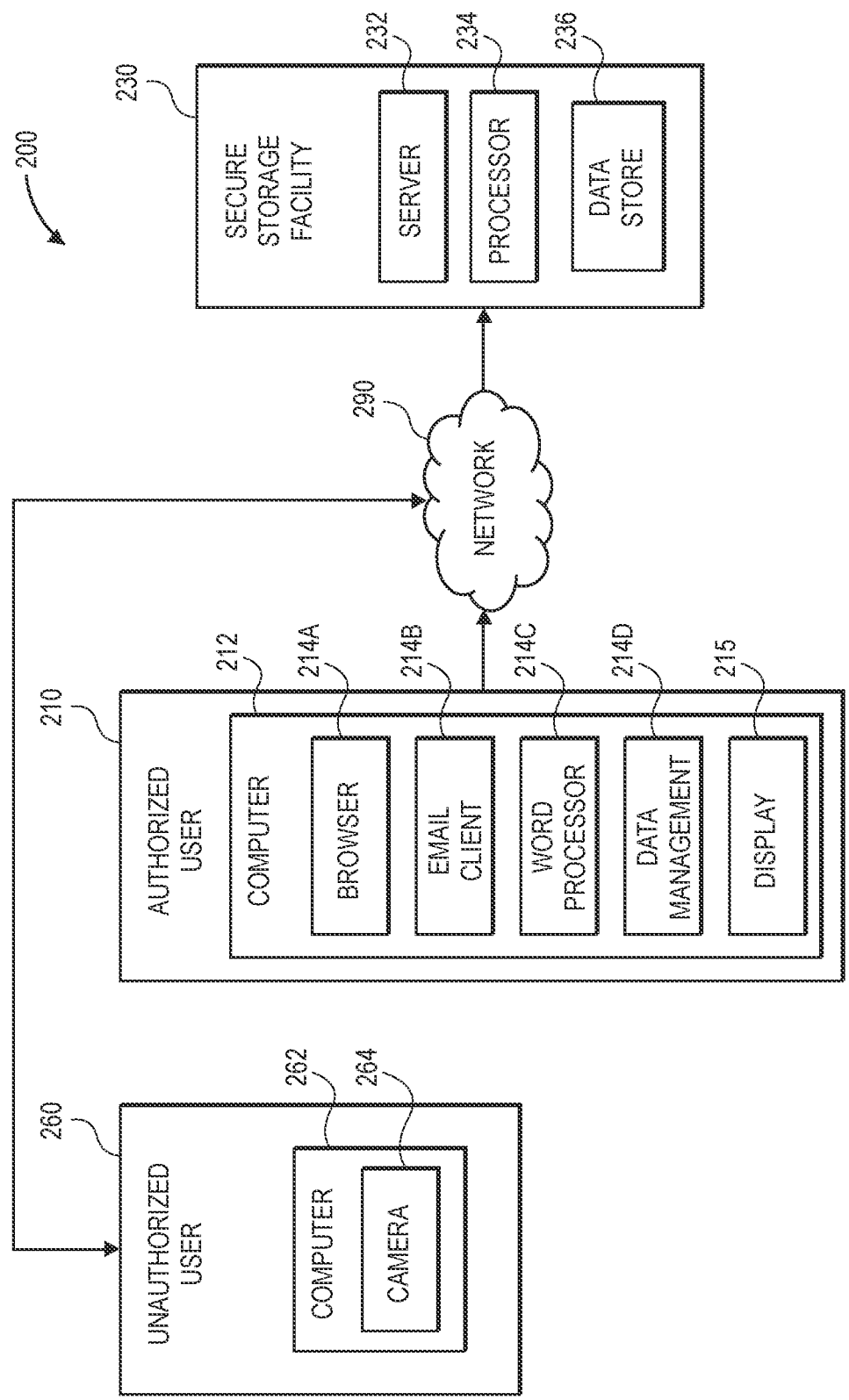
FIG. 2 is a block diagram of components of one system for detecting screen captures or recordings in accordance with implementations of the present disclosure.

Referring to FIG. 2, a block diagram of components of one system 200 for detecting screen captures or recordings in accordance with embodiments of the present disclosure is shown. Except where otherwise noted, reference numerals preceded by the number "2" shown in the block diagram of FIG. 2 indicate components or features that are similar to components or features having reference numerals preceded by the number "1" shown in FIGS. 1A through 1H.

The system 200 of FIG. 2 includes an authorized user 210, a secure storage facility 230 and an unauthorized user 260, which may operate computer systems that may connect to one another or to other computer systems (not shown) over one or more networks 290, which may include the Internet in whole or in part.

The authorized user 210 may be any individual (e.g., a human operator) or entity that is authorized to access sensitive information or data, which may be maintained by the secure storage facility 230 or any other systems (not shown). For example, the authorized user 210 may be designated as having a level of clearance, authorization or permission to access the sensitive information or data, e.g., upon entry of a passcode, a password, an identifier, a credential, or any other authenticating information or data, over the networks 290 or otherwise.

As is shown in FIG. 2, the authorized user 210 may access a computer 212 having one or more processors, data stores (e.g., data bases) or memory components, transceivers or other systems that is programmed with or has access to one or more sets of instructions.

The computer 212 may be or comprise a device that is specifically programmed or adapted for one or more purposes, or a general-purpose device such as a desktop computer, a tablet computer, a laptop computer, a television, or an appliance. The computer 212 includes a display 215, and may include any form of input and/or output peripherals such as scanners, readers, keyboards, keypads or pointing devices. The display 215 may be a monitor, a television, or any other like machine having a screen for viewing rendered video content. For example, the display 215 may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. In some implementations, the display 215 may be a capacitive touchscreen, a resistive touchscreen, or any other system for receiving interactions by the user 110.

The computer 212 may be connected to or otherwise communicate with a computer of the secure storage facility 230 or any other computer devices associated with other users via the one or more networks 290, by the transmission and receipt of digital data. The computer 212 may be programmed to execute one or more applications for viewing, interacting with or manipulating sensitive information or data, including but not limited to a browser 214A, an electronic mail client 214B, a word processor 214C, a data management application 214D, or others.

The browser 214A may be any application or system configured to permit users, e.g., the authorized user 210, to download networked content to and/or upload networked content from one or more other computer devices, to display such networked content on the display 215, and to receive one or more interactions with the networked content. The electronic mail client 214B may be any application configured to permit users, e.g., the authorized user 210, to generate, view, edit, transmit, receive and/or store electronic mail messages, and may include any additional relevant or unrelated capacities or specifications. Additionally, the electronic mail client 214B may operate in conjunction with one or more other applications or systems that may, but need not, be related to the sending or receipt of electronic mail, including but not limited to calendar applications, contact management applications, task management applications or any other like applications.

The word processor 214C may be any application configured to permit users, e.g., the authorized user 210, to compose, edit, format, or print documents by a computer device, viz., the computer 212. The data management software 214D may be any application configured to permit users to enter, organize, process, view or analyze text, numbers or other data, e.g., according to one or more formulas or functions, or in any other manner. In some implementations, the word processor 214C or the data management software 214D may generate or manipulate documents that primarily include text or numbers, but may also include images or other multimedia.

In addition to the browser 214A, the E-mail client 214B, the word processor 214C or the data management software 214D, those of ordinary skill in the pertinent arts will recognize that the computer 212 may operate one or more other software applications including but not limited to social networking, personal management or mapping applications. Moreover, the computer 212 may further feature any number of hardware components including but not limited to one or more sensors (e.g., a cellular telephone transceiver, a Global Positioning Service receiver, an accelerometer, a gyroscope or a compass).

The secure storage facility 230 may be any computer device or system for storing information or data that is sensitive in nature or has been designated as such. As is shown in FIG. 2, the secure storage facility 230 includes one or more physical computer servers 232, processors 234 and data stores 236, which may be any computer storage devices or media for storing information or data thereon. In some embodiments, the secure storage facility 230 may have enhanced security measures or features (e.g., physical or virtual) that enable information or data to be stored therein at a higher level of security or with greater confidence. For example, the secure storage facility 230 may be located in a physically secure structure or building, and may feature restricted virtual access via a firewall, virtual personal network (or VPN) or like barrier, along with one or more monitoring systems for tracking and recording access to the secure storage facility 230, or attempts to access the secure storage facility 230.

The data store 236 may include any number of buckets or other storage spaces that may be associated with a distribution list or any other concept. In some embodiments, one or more of the storage spaces of the data store 236 may be a file system directory or folder, or like component, and may form a basis for accounting for usage of the secure storage facility 230 by any other entities. Each of such storage spaces may be used to store one or more objects, e.g., a sequence or set of bits of any type. For example, the objects may include or represent electronic messages, text data, executable program code, audio, video or image data, or any other type of digital data, each of which may be stored or manipulated within the secure storage facility 230 in a similar fashion. One or more storage spaces of the data store 236 may further include associated metadata describing aspects or properties of the storage spaces, or instructions of handling contents of the storage spaces.

For example, the metadata may include information identifying a date on which a storage space was created, an identity of a user who created the storage space, identities of users having access to the storage space, whether the storage space includes any objects (e.g., electronic messages or content thereof), or any other relevant information. In some implementations, the metadata may include information regarding usage of a respective one of the storage spaces, a total size of one or more files stored therein, or any history surrounding access to the one of the storage spaces (e.g., times or dates on which access was granted or denied, and to which users, and/or IP addresses of computing devices from which access was requested). The metadata may also include a predetermined expiration time, period or interval at which content within the one of the storage spaces may automatically expire or be automatically deleted.

In some implementations, each of the storage spaces may be associated with a respective unique identifier, e.g., of a user or distribution list associated to and/or assigned to the one of the storage spaces. The identifier may be specified by a user or automatically assigned to the one of the storage spaces by the secure storage facility 230. The unique identifier may be stored within metadata of one of the storage spaces, or as a separate property or field within one of the storage spaces.

The data store 236 may also include access policies for accessing sensitive information or data stored thereon. The access policies may include any information needed to control access to objects stored on the data store, and may include information identifying a user or users (e.g., members of a distribution list) that are permitted to access the data store 236 and its associated objects, and in which capacity. For example, one or more storage spaces of the data store 236 may include user identifiers and/or authentication credentials (e.g., passwords) of users, and may further specify whether a given user is allowed to read, modify or copy objects in a given storage space, write objects to the storage space and/or remove objects from the storage space. The access policies may further include default, customized or group-oriented policies which limit read access or write access to subsets of users in a given group, or according to any other security or access-limiting model.

The unauthorized user 260 may be any individual (e.g., a human operator) or entity that is not authorized to access sensitive information or data, which may be maintained by the secure storage facility 230 or any other systems (not shown). For example, the unauthorized user 260 may be designated as having a level of clearance, authorization or permission that is insufficient to access the sensitive information or data, over the networks 290 or otherwise.

As is shown in FIG. 2, the unauthorized user 260 may access a computer 262 having one or more processors, data stores (e.g., data bases) or memory components, transceivers or other systems that is programmed with or has access to one or more sets of instructions.

In particular, the computer 262 may include one or more onboard or associated cameras 264 that are configured to capture visual images, depth images, or any other type or form of imaging data provided thereon or therewith. For example, the cameras 264 may include color sensors, depth sensors, memory or storage components, processors or any other features that may be required in order to capture, analyze and/or store imaging data from within an environment, including but not limited to images or other content rendered by the display 215. For example, the camera 264 and any other sensors provided thereon may be configured to capture one or more still or moving images, along with any relevant audio signals or other information. The camera 264 may be any type or form of system component for capturing imaging data (e.g., reflected light) of any kind or for any purpose. For example, in some embodiments, the camera 264 may include a red, green, blue ("RGB") color camera, a still camera, a motion capture/video camera or any other type or form of camera. In other embodiments, the camera 264 may include a depth-sensing camera, such as an RGBz (or RGBD) camera. In still other embodiments, the camera 264 may include a thermographic or infrared (IR) camera. Additionally, in some embodiments, the camera 264 may include a camera module including a lens and an image sensor configured to convert an optical image obtained by the lens of the camera into a digital signal or digital representation of the image, including image resolutions of varying degrees that may be captured and stored at various rates (e.g., frames per second).

The cameras 264 may include one or more sensors, memory or storage components and processors, and such sensors, memory components or processors may further include one or more photosensitive surfaces, filters, chips, electrodes, clocks, boards, timers or any other relevant features (not shown). The cameras 264 may be homogenous or heterogeneous in nature, and may include manual or automatic features for modifying their respective fields of view or orientations. For example, the cameras 264 may be configured in fixed positions, or with fixed orientations, or may include one or more features for adjusting positions or orientations of the cameras 264.

In some implementations, the computer 262 may include any of the features or components, or be programmed to execute any of the applications, described above with respect to the computer 212 of the authorized user 210. In some implementations, the computer 262 may include any other features or components, or may be programmed to execute any other applications. The computer 262 may be further configured to execute any function or processing of imaging data captured by the camera 264, or to transmit information or data regarding the imaging data to any external computer devices or systems.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some implementations, the network 290 may be a private or semi-private network, such as a corporate or university intranet. The network 290 may include one or more wireless networks, such as a Global System for Mobile Communications ("GSM") network, a Code Division Multiple Access ("CDMA") network, a Long-Term Evolution ("LTE") network, a 5G network, or some other type of wireless network. Protocols and components for communicating via the Internet or any of the other aforementioned types of communication networks are well known to those skilled in the art of computer communications and thus, need not be described in more detail herein.

Although the system 200 of FIG. 2 includes single boxes corresponding to the authorized user 210, the secure storage facility 230, and the unauthorized user 260, those of ordinary skill in the pertinent arts will recognize that the system 200 may include any number or type of authorized users 210, secure storage facilities 230 and unauthorized users 260, in accordance with the present disclosure. Moreover, the authorized user 210 may operate in the same location as the secure storage facility 230 or remotely, e.g., in a different physical location than the secure storage facility 230, such as by operating the computer 212 or any other systems connected to computer devices or systems of the secure storage facility 230 over the one or more networks 290.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The authorized user 210, the secure storage facility 230, and the unauthorized user 260 may use any web-enabled or Internet applications or features, or any other client-server applications or features (e.g., messaging techniques), to connect to the network 290, or to communicate with one another. For example, the authorized user 210, the secure storage facility 230, and the unauthorized user 260 may be adapted to transmit information or data in the form of synchronous or asynchronous messages to one another or to any other computer device in real time or in near-real time, or in one or more offline processes, via the network 290. Those of ordinary skill in the pertinent art would recognize that the authorized user 210, the secure storage facility 230, and the unauthorized user 260 may operate, include or be associated with any of a number of computing devices that are capable of communicating over the network 290, and that the protocols and components for providing communication between such devices are well known to those skilled in the art of computer communications and need not be described in more detail herein.

Those of ordinary skill in the pertinent arts will understand that process steps described herein as being performed by an "authorized user," a "secure storage facility," or an "unauthorized user," or like terms, may be automated steps performed by their respective computer devices or resources, or implemented within software modules (or computer programs) executed by one or more general purpose computers. Those of ordinary skill in the pertinent arts would also recognize that process steps described as being performed by an "authorized user," or an "unauthorized user," or like terms, may be typically performed by a human, but could, alternatively, be performed by an automated agent. The protocols and components for providing communication between the authorized user 210, the secure storage facility 230, and the unauthorized user 260 may be known to those skilled in the art of computer communications and need not be described in more detail herein.

The data and/or computer executable instructions, programs, firmware, software and the like (also referred to herein as "computer-executable" components) described herein may be stored on a computer-readable medium that is within or accessible by computers or computer components such as the computer 212, the server 232, and the computer 262, or any other computers or control systems utilized by the authorized user 210, the secure storage facility 230, and the unauthorized user 260, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
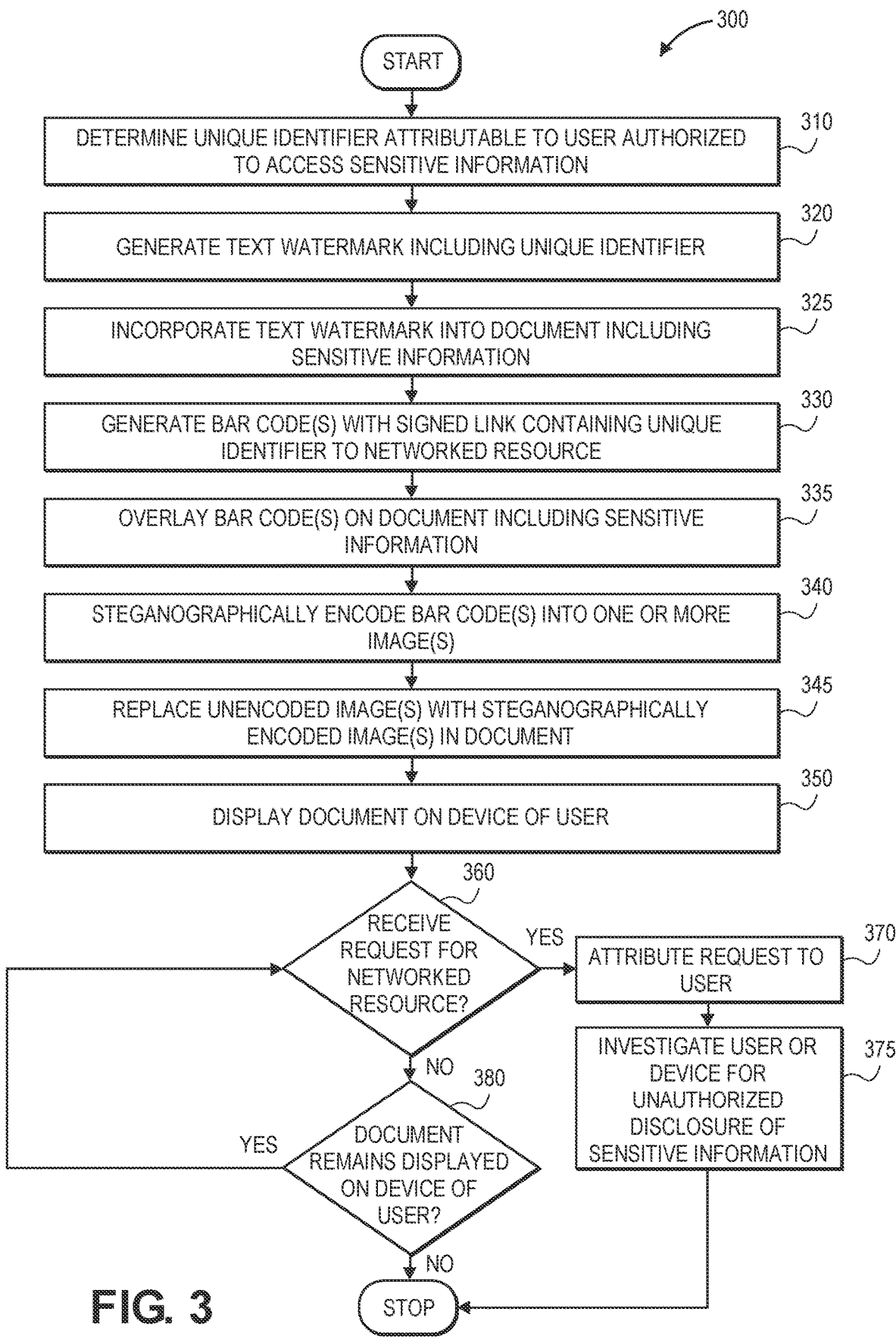
FIG. 3 is a flow chart of one process for detecting screen captures or recordings in accordance with implementations of the present disclosure.

Referring to FIG. 3, a flow chart 300 of one process for detecting screen captures or recordings in accordance with implementations of the present disclosure is shown. At box 310, a unique identifier of a user authorized to access sensitive information is determined. The unique identifier may be generated based on identifying information regarding the user, such as a name of the user, a number assigned to or associated with the user, or an identifier of an authenticated session of the user.

In some implementations, the unique identifier may be a cryptographic one-way hash of the identifying information. Moreover, in some information, the unique identifier may be generated based at least in part on information determined according to a fingerprinting technique, which may uniquely identify a combination of an application operating on a computer device of the user, as well as the computer device or an operating system or software suite operating thereon.

The sensitive information may include, but need not be limited to, any information that is not intended to be viewed, accessed or manipulated by all persons, and is instead restricted for viewing, accessing or manipulation by a subset of persons. For example, in some implementations, the sensitive information may include personally identifiable information (or "PII"), commercial data, trade secrets, confidential information (e.g., business plans, financial records, privileged information), documents to which access has been restricted by a government authority (e.g., subject to one or more classifications), or any other information or data that is objectively or subjectively sensitive in nature.

The user may be authorized to access the sensitive information in any manner. For example, in some implementations, the user may be authenticated by entry of a passcode, a password, an identifier, a credential, or any other authenticating information or data, which may be detected from the user (e.g., a fingerprint, a palm print, a retinal scan), or by one or more devices with built-in authentication features (e.g., RFID tags) or others.

At box 320, a text watermark including the unique identifier is generated. The text watermark may include at least the unique identifier, which may be generated in one or more predetermined fonts. For example, in some implementations, the unique identifier may be generated in a font that is designed or constructed to preserve the privacy of the unique identifier, or a font that is resistant to character recognition techniques (e.g., optical character recognition).

At box 325, the text watermark is incorporated into a document including sensitive information. The document may include at least some of the sensitive information that the user is authorized to access. The text watermark may be incorporated into the document in any manner and in any location, such as randomly throughout the document, e.g., in association with a <div> tag, or another tag, attribute or element, such as a page element or a structural element, that may define one or more portions of a document expressed in Hypertext Mark-Up Language (or "HTML"), or in any other language. Alternatively, the text watermark may be incorporated in a frame border element, e.g., in association with a <frame> tag, element or attribute, or otherwise in a page or page structure attribute such as a <rect> or Recto tag, element or attribute.

In some implementations, the text watermark may be overlaid on a document, e.g., in accordance with a style sheet or in any other manner.

At box 330, one or more bar codes or machine-readable representations of a link to a networked resource that includes the unique identifier are generated. The bar codes or other representations may be one-dimensional bar codes, two-dimensional bar codes, bokodes or any other form of coded representations of information or data. Some common one-dimensional bar codes include Code 39 codes, Extended Code 39 codes, Code 128 Codes, UCC/European Article Numbering (or "EAN") 128 codes, Universal Product Code (or "UPC") A or E codes, EAN13 or EAN8 codes, Interleaved (or "ITF") codes, CodaBar codes, Code 11 codes, Code 93 codes, GS1 DataBar codes, GS1 DataBar Expanded codes, GS1 DataBar Limited codes, GS1 DataBar Coupon codes, DataBar Omni-Directional Stacked or Truncated codes, MSI Plessey codes, POSTNET codes, PLANET codes or OneCode codes. Some common two-dimensional bar codes include PDF417 codes, Data Matrix codes, Maxi-Code codes, Aztec codes or QR codes. Additionally, some bar codes or machine-readable representations may also include other alphanumeric characters or symbols.

Alternatively, in some implementations, any optically recognizable encoding (e.g., an image, a symbol or anything else) that may be recognized by a camera and encoded with a URI or a URL to a networked resource that includes the unique identifier may be generated. The machine-readable representations of the present disclosure may but need not be bar codes.

The networked resource may be referenced by a fully qualified domain name, viz., a host name and a domain name, or a subdirectory or file name that includes the unique identifier. In some implementations, the link may include a URI or a URL including the fully qualified domain name. Moreover, in some implementations, the networked resource may be configured to return a response code indicating that a request for the networked resource has been successful, such as an "HTTP 200 OK" success status response code, which may be cacheable by default.

The response code returned may include content that is selected as a function of a request for the networked resource that is received from a device.

The bar codes or other machine-readable representations of the present disclosure may be of any type or form, and may be represented in any colors. For example, in some implementations, a bar code may be represented in black-and-white colors, to maximize a likelihood that the bar code will be detected within imaging data captured by a camera or personal device, and to aid in such recognition applications or processes. In some implementations, a bar code may be represented in one or more colors corresponding to text, images or other features within a document containing sensitive information. Alternatively, colors of the bar codes may be selected on any other basis.

At box 335, the bar codes are overlaid on a document including sensitive information. In some implementations, the bar codes may be overlaid by a style sheet (or "CSS"), which outlines how or where elements may be displayed on a screen, on paper, or in any other media that is constructed from a markup language or in any other manner. Alternatively, or additionally, the bar codes may be embedded in code for rendering the document.

At box 340, the text watermarks or the bar codes are steganographically encoded into one or more images. In some implementations, one or more least significant bits or less significant bits of color channels of selected representative pixels of images into which a bar code (or any other representation) is to be encoded may be modified slightly, as necessary, in order to generate contrasts between and within such pixels for rendering the text watermarks or the bar code. A pattern corresponding to the text watermark or the bar code may be encoded into a portion of an image by changing values of the least significant bits or less significant bits of such pixels to zero or one, as necessary, which may cause the text watermark or the bar code to be visible to one or more imaging devices and/or computer-based processing applications or components, yet remain invisible to the human eye.

At box 345, one or more unencoded images within the document containing sensitive information are replaced with one or more of the images that are steganographically encoded with the document at box 340.

In some implementations, a document containing sensitive information may include only the text watermark incorporated therein, only a bar code overlaid thereon, or only a text watermark or a bar code steganographically encoded into an image. A document containing sensitive information may but need not include text watermarks, and bar codes overlaid thereon, and images having bar codes steganographically encoded therein in accordance with implementations of the present disclosure.

At box 350, the document containing the sensitive information, as well as the incorporated text watermarks, the overlaid bar codes and/or the steganographically encoded images is displayed on a device associated with the user.

In some implementations, the document may be displayed by any application for viewing information or data by humans, such as a browser, an e-mail client, a personal information manager, a presentation application, a spreadsheet application, a word processor, or any other application. The document may be displayed by any such application operating on a general-purpose computer, e.g., a desktop computer, a laptop computer, or others, or a special-purpose computer, e.g., a terminal provided in a commercial, financial or government setting that is ordinarily restricted in use to authorized users only, or any other computer device or system.

At box 360, whether a request for the networked resource has been received is determined. For example, many personal devices or other systems that are equipped with cameras are programmed with one or more applications or processes to process imaging data captured by such cameras to determine whether such imaging data depicts a bar code or another predetermined representation, such as a QR code, and to interpret the bar code. For example, in some implementations, a camera or a personal device may be programmed or equipped to search imaging data for position markers or other aspects of bar codes that are located in known, specific positions or orientations with respect to one another. Upon recognizing the position markers or other aspects of bar codes, the camera or personal device may interpret the portions of the images that are determined to include bar codes, to decode the bar codes and recognize the bar codes as references to networked resources (e.g., pages or other external resources having information, data or other content included therein), and access any such resources via any links encoded in such bar codes.

Where the link encoded in the bar codes generated at box 330 is not shared or otherwise provided to any other devices or systems, a request for the networked resource may have only been received following a capture or recording of an image of the document displayed on the device of the user, at a time or during a period when the document was displayed by the device.

If a request for the networked resource is received, the process advances to box 370, where the request is attributed to the user, e.g., based on the unique identifier included in the link represented in the bar code or other representation.

At box 375, the user and/or the device are investigated for unauthorized disclosure of the sensitive information, and the process ends. In some implementations, a session of the user may be terminated immediately, and authorization of the user to access the sensitive information may be suspended temporarily or permanently.

In some implementations, the user may be contacted regarding his or her activities during the display of the document on the device associated with the user. In some other implementations, information regarding personnel present at or near the device when the document was displayed on the device associated with the user, e.g., access logs, registries or other records, may be obtained and evaluated to identify potential sources of the request. For example, in some implementations, one or more cameras or other security devices within a vicinity of the user or the device may be activated to capture images or other data regarding personnel at or near the device, and to identify such personnel accordingly. Alternatively, any other type or form of investigation may be conducted, e.g., virtually or in-person, following a receipt of a request, or upon otherwise determining that a watermark or a visual identifier is depicted within an image.

At box 380, whether the document remains displayed on the device of the user is determined. If the document is no longer displayed on the device of the user, then the process ends. If the document remains displayed on the device of the user, then the process returns to box 360, where whether a request for the networked resource is received is determined.

The process represented in the flow chart 300 of FIG. 3 may be repeated for any number of documents displayed on the device of the user. For example, in some implementations, the text watermark may be incorporated into every document displayed on the device of the user, the bar code may be overlaid on every document displayed on the device of the user, and one or more images including the bar code steganographically encoded therein may replace images in every document displayed on the device of the user.

Moreover, the incorporation of the text watermark, the overlay of the bar codes, or the replacement of images with steganographically encoded images may be performed by one or more back-end systems (e.g., sources of the sensitive information) that furnish the sensitive information to the device of the user, or by one or more applications operating on the device of the user.

In some implementations, images that are posted, stored or shared may be processed, in series or in parallel, and individually or in bulk, to determine whether any of such images includes a watermark or a visual identifier depicted therein. Upon determining that any of such images includes a watermark or a visual identifier, the image may be attributed to the user, and any of the actions associated with box 375 or otherwise may be executed accordingly.

Figure 4A:
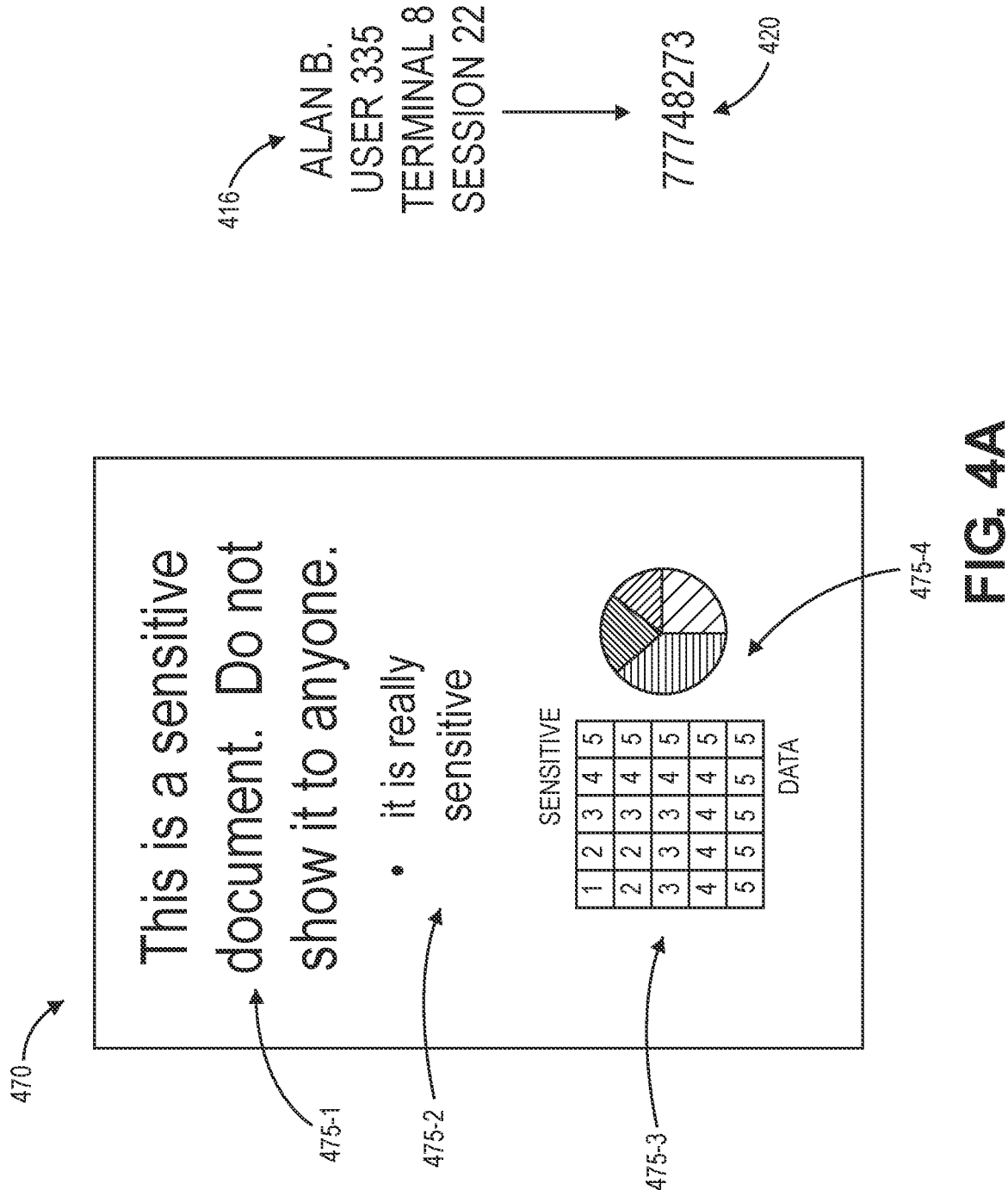
FIGS. 4A and 4B are views of aspects of one system or process for detecting screen captures or recordings in accordance with implementations of the present disclosure.
Figure 4B:
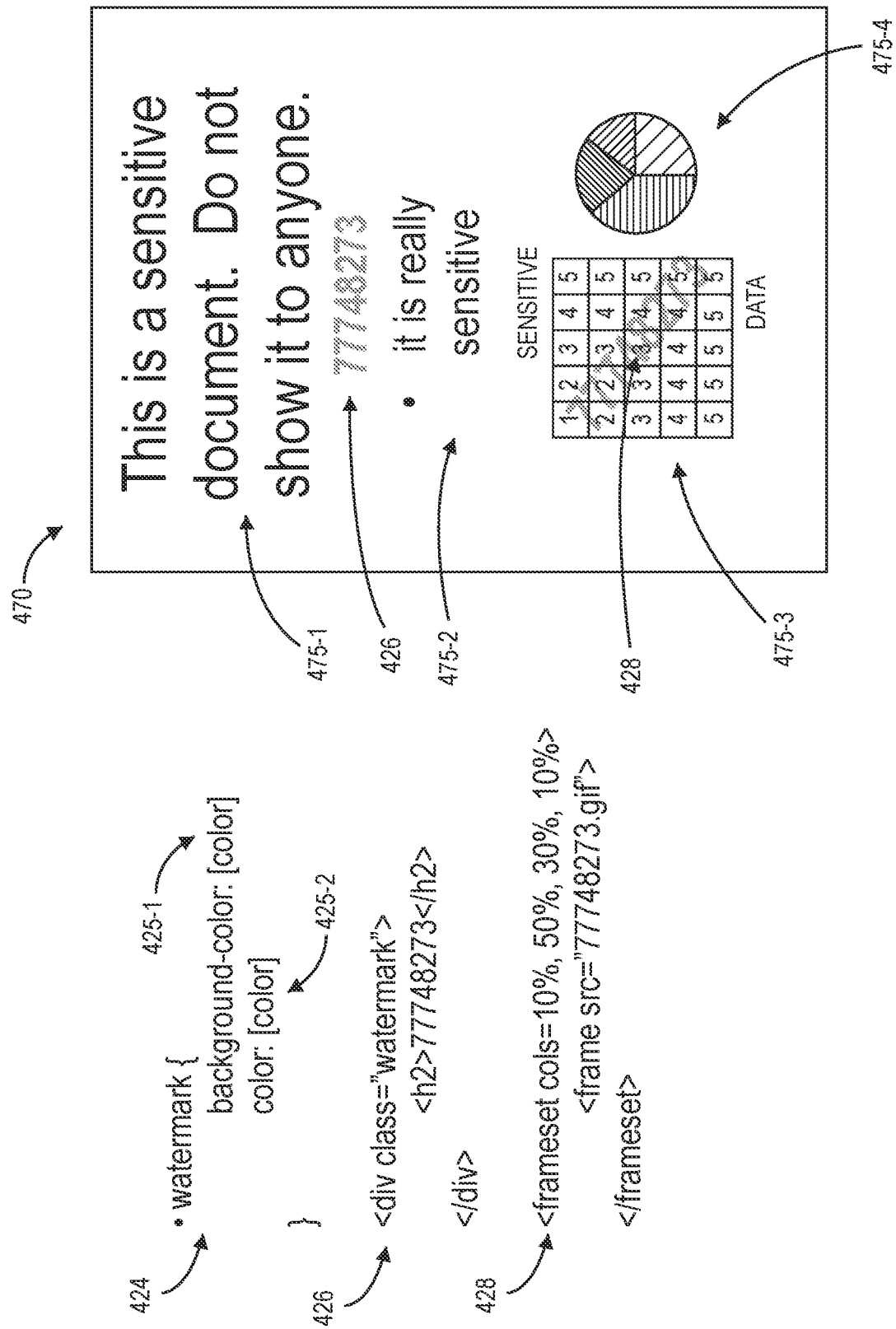

Watermarks, visual identifiers or other information or data may be incorporated into documents containing sensitive information or data in many ways according to implementations of the present disclosure. Referring to FIGS. 4A and 4B, views of aspects of one system or process for detecting screen captures or recordings in accordance with implementations of the present disclosure are shown. Except where otherwise noted, reference numerals preceded by the number "4" shown in FIGS. 4A and 4B indicate components or features that are similar to components or features having reference numerals preceded by the number "2" shown in the block diagram of FIG. 2, or by the number "1" shown in FIGS. 1A through 1H.

As is shown in FIG. 4A, a document 470 includes sensitive information or data 475-1, 475-2, 475-3, 475-4, e.g., sets of text 475-1, 475-2 and data 475-3, 475-4 represented in graphs, tables or plots. The sensitive information or data 475-1, 475-2, 475-3, 475-4 may be of any type or form, including but not limited to personally identifiable information (or "PII"), commercial data, trade secrets, confidential information (e.g., business plans, financial records, privileged information), documents to which access has been restricted by a government authority (e.g., subject to one or more classifications), or any other information or data.

As is further shown in FIG. 4A, a unique identifier 420 of a user may be generated based on attributes 416 of the user, which may include but need not be limited to a name of the user, a user identifier or number of the user, an identifier of a computer system accessed by the user, an identifier of a session operated the computer system, or any other information or data.

As is shown in FIG. 4B, the unique identifier 420 may be incorporated into the document 470 by updating a document object model (or "DOM") of the document 470, by editing language from which the document 470 was constructed to include one or more references to the unique identifier 420, or by overlaying the unique identifier 420 over one or more portions of the document 470 in any manner. For example, as is shown in FIG. 4B, a set of code 424 identifying a style by which a class is to be rendered is added to code for rendering the document 470, as well as a sets of code 426, 428 for rendering the unique identifier 420 in accordance with that class, are shown. The set of code 426 includes a <div> element or tag, defines a division or a section of the document 470 that includes the unique identifier 420, and is rendered in accordance with the style of the class described in the set of code 424. The set of code 428 includes a <frameset> element for identifying frames of the document 470 and placing the unique identifier in one or more of such frames, rendered in accordance with the style of the class described in the set of code 424.

As is further shown in FIG. 4B, the set of code 424 delineates a background color 425-1 and a color 425-2 in which the watermark is to be depicted within the document 470. In some implementations, the colors 425-1, 425-2 may be selected to provide a sufficient level of contrast between one another, or to maximize the level of contrast, e.g., black and white, or any other contrasting colors. In some other implementations, the colors 425-1, 425-2 may be selected from a color palette derived from the document 470. For example, where one or both of the colors 425-1, 425-2 are prominently depicted within the document 470, any attempt to process images of the document 470 to replace either or both of the colors 425-1, 425-2 will likewise cause substantial portions of the document 470 to be removed or replaced.

Figure 5B:
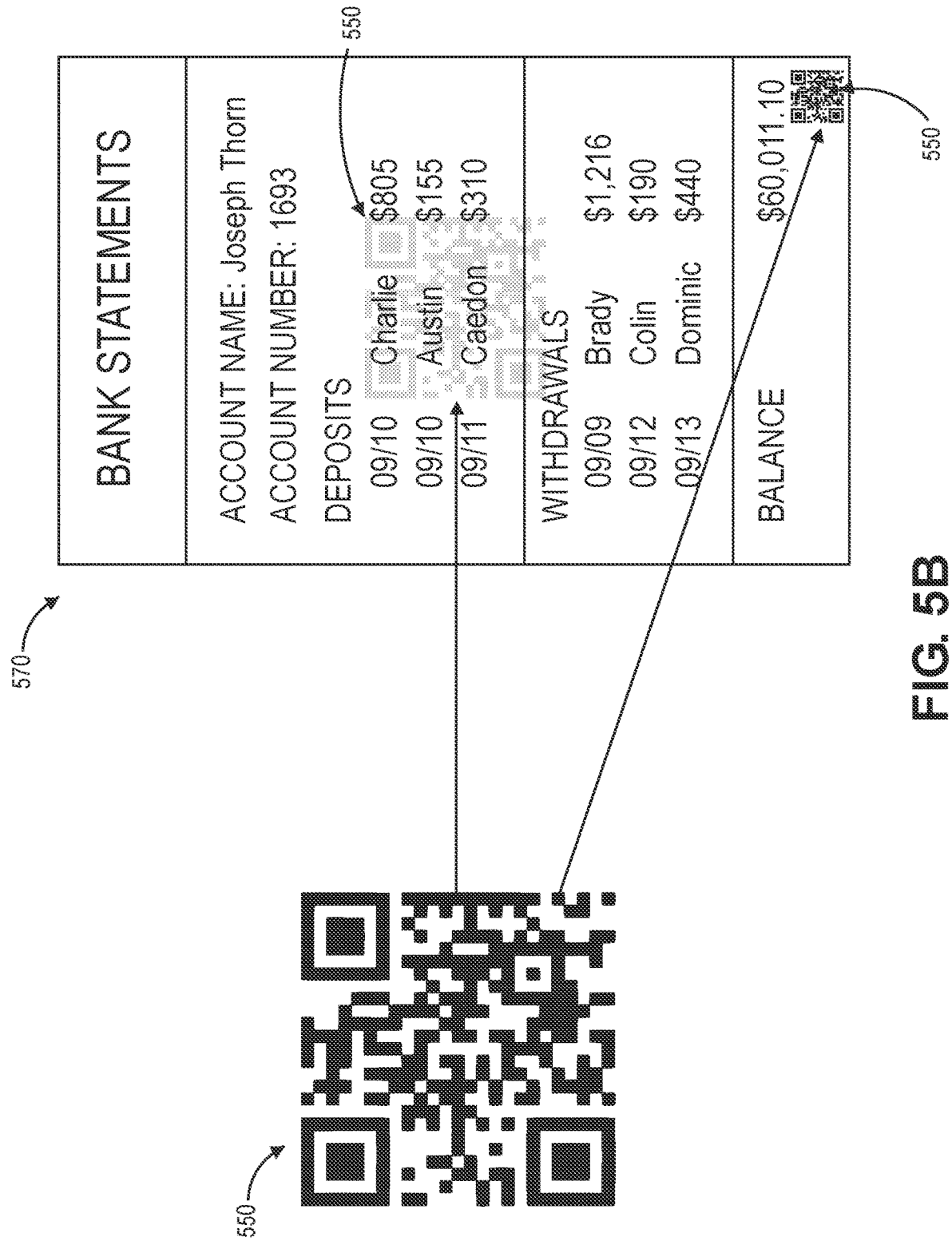

Referring to FIGS. 5A and 5B, views of aspects of one system or process for detecting screen captures or recordings in accordance with implementations of the present disclosure are shown. Except where otherwise noted, reference numerals preceded by the number "5" shown in FIGS. 5A and 5B indicate components or features that are similar to components or features having reference numerals preceded by the number "4" shown in FIGS. 4A and 4B, by the number "2" shown in the block diagram of FIG. 2, or by the number "1" shown in FIGS. 1A through 1H.

As is shown in FIG. 5A, a document 570 includes sensitive information or data, e.g., a bank statement or another financial record. For example, and as is shown in FIG. 5A, the document 570 includes an identifier 575-1 of a holder of an account at a bank or another financial institution, as well as an identifier 575-2 of a number of the account. The document 570 further identifiers a set of deposits 575-3 made to the account, as well as a set of withdrawals made from the account, and a balance 575-5 of the account at a given time.

As is shown in FIG. 5B, a visual identifier 550, e.g., a bar code, may be incorporated into the document 570 when the document 570 is rendered on a display of a computer system operated by an authorized user. The visual identifier 550 may be an encoded representation of a link (or another URI or URL) to a networked resource. The link encoded into the visual identifier 550 may include a unique identifier of the authorized user, which may be a one-way hash generated based on one or more attributes of the authorized user (e.g., a name of the authorized user, an identifier of a computer used by the authorized user to access sensitive information or data, a session identifier, or others).

The visual identifier 550 may be incorporated into the document 570 in any locations or orientations. For example, as is shown in FIG. 5B, in some implementations, the visual identifier 550 may be located or provided in a central portion or region of the document 570 that overlays or lies beneath or around sensitive information of the document 570, e.g., the deposits 575-3. In some implementations, the visual identifier 550 may be located or provided in a margin, e.g., a bottom or side margin of the document 570.

The visual identifier 550 may be incorporated into the document 570 in any colors or sizes. For example, in some implementations, the visual identifier 550 may be rendered in black-and-white colors, such as to trigger one or more applications operating on a camera or a camera-equipped device that are programmed to search for, localize, and decode one or more predetermined visual identifiers (e.g., bar codes).

For example, as is shown in FIG. 5B, the visual identifier 550 may be rendered in colors selected from a color palette derived from the document 570. In some other implementations, the visual identifier 550 may be rendered in black and white, in order to maximize contrasts between dark and light portions of the visual identifier 550, and increase a likelihood that the visual identifier 550 will be detected and localized by one or more applications operating on a camera or a camera-equipped device. Alternatively, the visual identifier 550 may be rendered in one or more shades of gray, or in any other colors, such as those selected from a color palette of the document 570, or from any other source or on any other basis.

The visual identifiers 550 may be incorporated into the document 570 by embedding references to the visual identifiers 550 in code for rendering the document 570, or by rendering overlays including the visual identifiers 550 on the document 570, according to a style sheet or in any other manner.

Figure 6A:
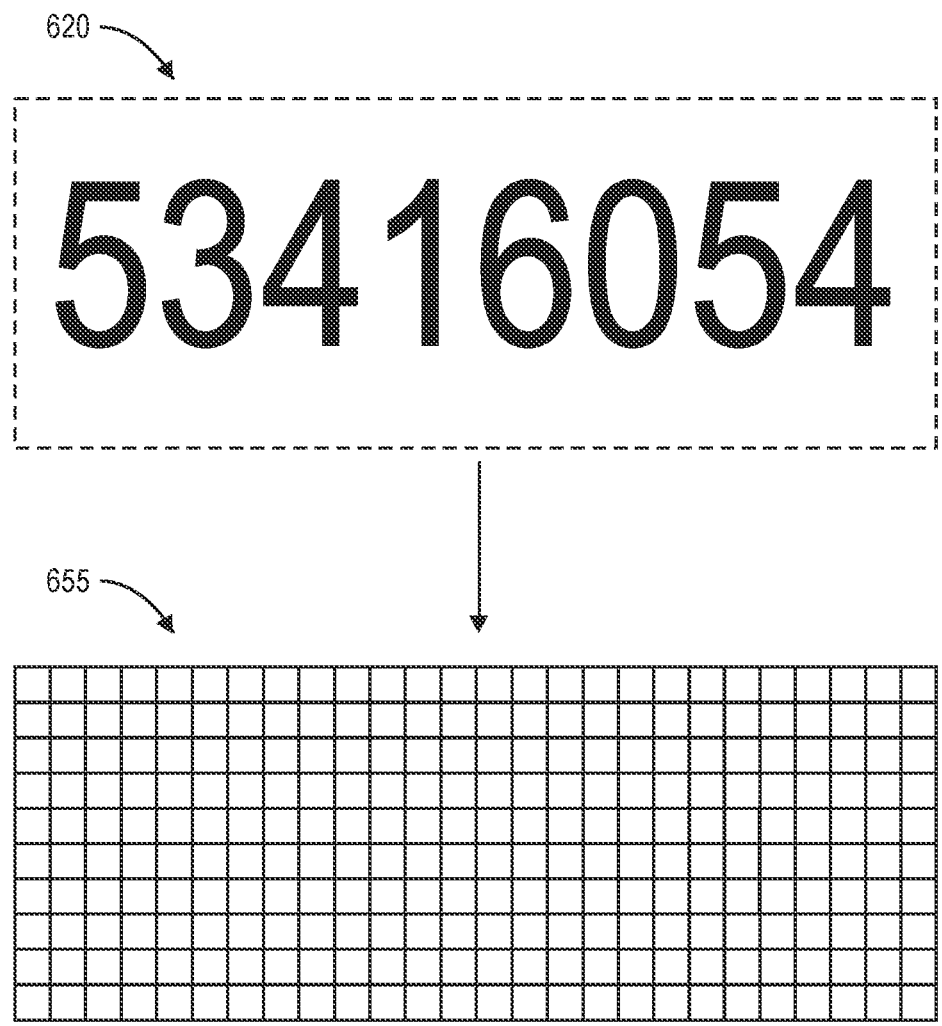
FIGS. 6A and 6B are views of aspects of one system or process for detecting screen captures or recordings in accordance with implementations of the present disclosure.
Figure 6B:
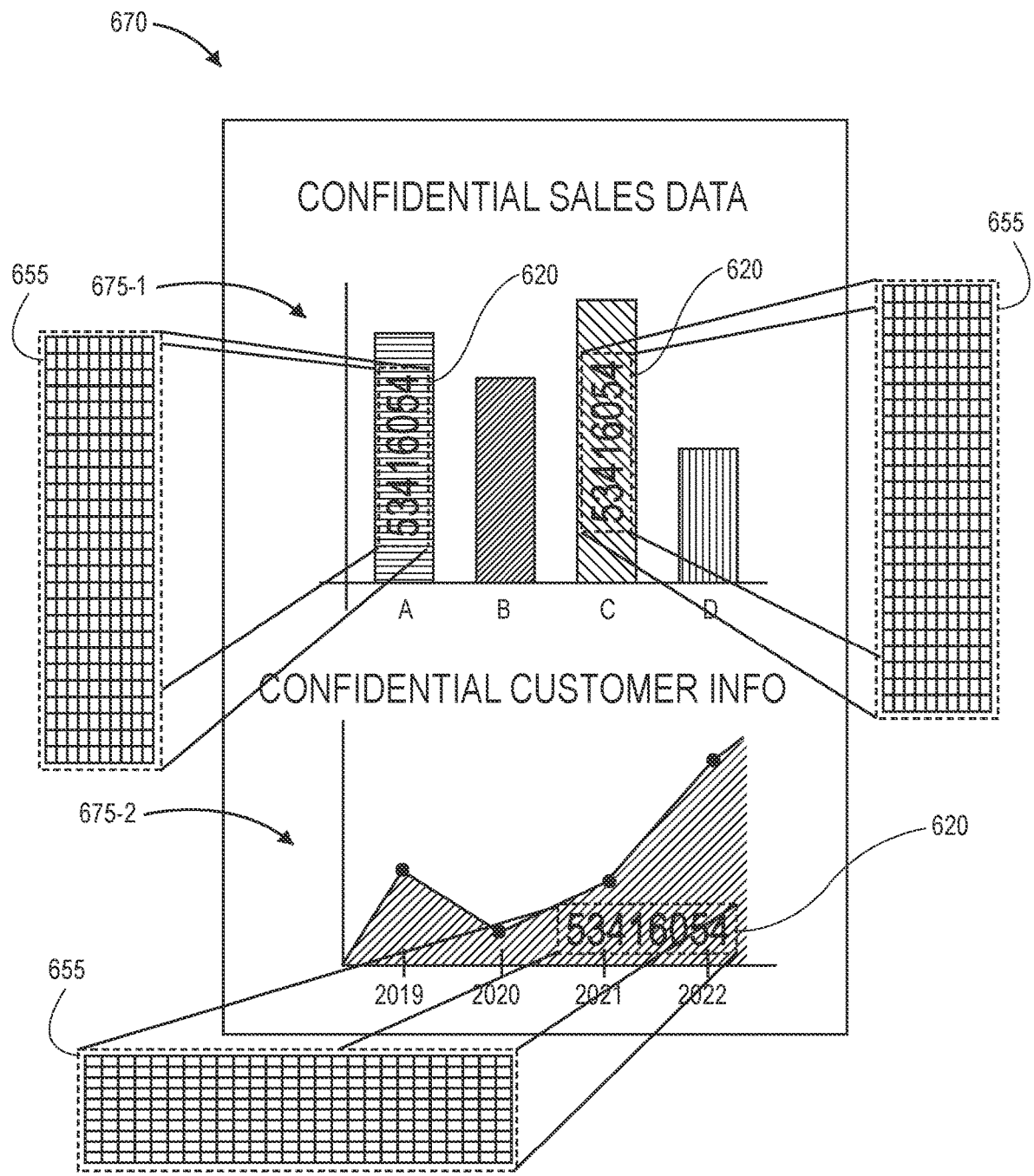

Referring to FIGS. 6A and 6B, views of aspects of one system or process for detecting screen captures or recordings in accordance with implementations of the present disclosure are shown. Except where otherwise noted, reference numerals preceded by the number "6" shown in FIGS. 6A and 6B indicate components or features that are similar to components or features having reference numerals preceded by the number "5" shown in FIGS. 5A and 5B, by the number "4" shown in FIGS. 4A and 4B, by the number "2" shown in the block diagram of FIG. 2, or by the number "1" shown in FIGS. 1A through 1H.

As is shown in FIG. 6A, a unique identifier 620 of a user authorized to access sensitive information or data is shown. The unique identifier 620 may have been generated based on any attributes of the user, such as by providing one or more of such attributes to a hash function, e.g., a cryptographic one-way hash function.

In some implementations, the unique identifier 620 may be steganographically encoded into a portion of a visual image to be rendered in association with a document containing sensitive information or data. The portion of the visual image into which the unique identifier 620 is to be encoded may be selected on any basis, including any characteristics or qualities of the representative pixels in the portion of the visual image, or any other relevant factor. Amounts or extents to which such pixels must be modified may be determined based on the attributes of the unique identifier 620.

For example, as is shown in FIG. 6A, the unique identifier 620 comprises an array 655 of sections or segments corresponding to sections or segments of the unique identifier 620. The array 655 includes values corresponding to amounts or extents to which pixels of a document must be steganographically modified in order to encode the unique identifier 620 into the document. The values may be determined on any basis, such as characteristics or qualities of the representative pixels to be modified, as well as minimum or maximum thresholds for detectability or invisibility, or any other factor.

For example, the array 655 may indicate that pixel values in sections or segments corresponding to darkened (or black) areas of the unique identifier 620 shall be increased by a value of +n (e.g., in binary or decimal, according to a hexadecimal model or any other model), while pixel values in sections or segments corresponding to lightened (or white) areas of the unique identifier 620 shall be decreased by a value of −n. Those of ordinary skill in the pertinent arts will recognize that contrasts may be steganographically encoded into a visual image in any manner and by any extent. For example, referring again to the array 655 of FIG. 6A, alternatively, pixel values in sections or segments corresponding to lightened (or white) areas of the unique identifier 620 may be increased, and pixel values in sections or segments corresponding to darkened (or black) areas of the unique identifier 620 may be decreased, in order to generate the same contrast. Moreover, the extent to which a section or segment corresponding to darkened (or black) areas of the unique identifier 620 is modified need not be equal in magnitude and opposite in direction to the extent to which a section or segment corresponding to lightened (or white) areas of the unique identifier 620 is modified. Furthermore, where a portion of a visual image into which the unique identifier 620 is to be encoded varies in brightness, saturation or hue, representative pixels within the portion may be modified by various amounts or to various extents, as necessary, in order to encode the unique identifier 620 therein.

As is shown in FIG. 6B, the array 655 may be used to steganographically encode the unique identifier 620 into a document 670 containing sensitive information or data, e.g., a bar graph 675-1 of sales data and a line graph 675-2 of customer information. Portions of the document 670, viz., portions of the bar graph 675-1 or the line graph 675-2, may be selected to accommodate the unique identifier 620 and may be selected on any basis. For example, in some implementations, a palette may be sampled from the bar graph 675-1 or the line graph 675-2, or of a style sheet used to render the document 670 in a document object model. Based on the palette, color variation palettes may be generated, e.g., by Fourier transforms, and the unique identifier 620 may be encoded into selected portions of the bar graph 675-1 or the line graph 675-2, as is shown in FIG. 6B.

In some implementations, a watermark or a bar code may be steganographically encoded into the bar graph 675-1, the line graph 675-2 or any other portion of the document 670, in the same manner as the unique identifier 620 shown in FIG. 6A or 6B, or any other manner.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow chart shown in FIG. 3, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A secure storage facility comprising:
   a first computer system comprising at least one computer processor unit and at least one non-transitory data store, wherein at least a portion of the at least one non-transitory data store has sensitive information stored thereon, and
   wherein the first computer system is programmed with one or more sets of instructions that, when executed by the first computer system, cause the first computer system to execute a method comprising:
      determining that a user of a second computer system is authorized to access at least some of the sensitive information;
      determining at least one attribute of the user;
      providing information representing the at least one attribute as an input to a hash function;
      generating an identifier of the user based at least in part on an output received from the hash function in response to the input;
      generating a set of text representing the identifier of the user;
      generating a link to a networked resource, wherein the link comprises the set of text representing the identifier of the user;
      encoding at least a first bar code with the link;
      incorporating at least the set of text representing the identifier of the user and the first bar code into a document comprising at least some of the sensitive information;
      causing a display of the document on at least one display of the second computer system;
      receiving a request for the networked resource from a third computer system over one or more networks; and determining, based at least in part on the request, that at least one image of the at least some of the sensitive information was captured by the third computer system.

2. The secure storage facility of claim 1, wherein incorporating at least the set of text representing the identifier of the user and the first bar code into the document comprises:
   steganographically encoding at least one of the set of text representing the identifier of the user or the first bar code into the document.

3. A computer-implemented method comprising:
   generating a unique identifier of a user of at least a first computer system, wherein the user is authorized to access sensitive information or data;
   generating a set of text representing the unique identifier of the user;
   generating a link to a networked resource, wherein the link comprises the set of text representing the unique identifier of the user;
   generating at least a first bar code, wherein the first bar code is encoded with the link;
   incorporating at least the set of text representing the unique identifier of the user and the first bar code into a document comprising at least some of the sensitive information or data;
   causing a display of the document on at least one display of the first computer system;
   receiving a request for the networked resource from a second computer system over one or more networks; and
   determining, based at least in part on the request, that at least one image of at least a portion of the at least some of the sensitive information or data was captured by the second computer system.

4. The computer-implemented method of claim 3, wherein generating the unique identifier of the user comprises:
   determining at least one attribute of the user, wherein the at least one attribute is at least one of:
   a name of the user;
   a number associated with the user;
   an identifier of the first computer system; or
   an identifier of a session during which the user operated the first computer system; and
   generating the unique identifier based at least in part on the at least one attribute of the user.

5. The computer-implemented method of claim 4, wherein generating the unique identifier of the user further comprises:
   providing information regarding the at least one attribute as an input to a cryptographic one-way hash function, wherein the unique identifier is generated based at least in part on an output received from the cryptographic one-way hash function in response to the input.

6. The computer-implemented method of claim 3, wherein incorporating at least the set of text representing the unique identifier of the user and the first bar code into the document comprising at least some of the sensitive information or data comprises:
   embedding at least one of a tag, a page element or a structural element referencing the unique identifier or an image of the first bar code into code for rendering the document.

7. The computer-implemented method of claim 3, wherein incorporating at least the set of text representing the unique identifier of the user and the first bar code into the document comprising at least some of the sensitive information or data comprises:
   steganographically encoding at least the set of text representing the unique identifier of the user into at least one image of the document.

8. The computer-implemented method of claim 3, wherein the set of text representing the unique identifier of the user is incorporated into the document in at least one of:
   a privacy-preserving font; or
   a font resistant to character recognition.

9. The computer-implemented method of claim 3, wherein incorporating at least the set of text representing the unique identifier of the user and the first bar code into a document comprising at least some of the sensitive information or data comprises:
   causing an overlay of at least one of the set of text or the first bar code to be displayed over at least a portion of the document.

10. The computer-implemented method of claim 3, wherein the first bar code is one of:
    a one-dimensional bar code;
    a two-dimensional bar code; or
    a bokode.

11. The computer-implemented method of claim 3, wherein the first bar code comprises an array of portions representing an encoding of the link, and
    wherein each of the portions is in one of a first color or a second color.

12. The computer-implemented method of claim 3, wherein the first color is black and the second color is white.

13. The computer-implemented method of claim 3, further comprising:
    determining a color palette of the document; and
    selecting the first color and the second color from the color palette.

14. The computer-implemented method of claim 3, wherein the sensitive information or data comprises at least one of:
    a business plan;
    commercial data;
    confidential information;
    a financial record;
    information classified by a government authority;
    personally identifiable information;
    privileged information; or
    a trade secret.

15. The computer-implemented method of claim 3, wherein the second computer device is associated with one of:
    the authorized user; or
    a user not authorized to access the sensitive information or data.

16. The computer-implemented method of claim 3, further comprising:
    in response to the request,
       transmitting an indication that the request has been processed successfully to the second computer system over the one or more networks.

17. The computer-implemented method of claim 16, wherein the indication comprises an HTTP Status Code 200 OK.

18. The computer-implemented method of claim 3, further comprising:
    determining a time at which the request was received, wherein determining that the at least one image of at least the portion of the document was captured by the second computer system comprises:

determining that the at least one image was captured at approximately the time at which the request was received.

19. A first computer system comprising at least one computer processor unit and at least one non-transitory data store, wherein the first computer system is programmed with one or more sets of instructions that, when executed by the first computer system, cause the first computer system to execute a method comprising:

determining that a user of a second computer system is authorized to access at least some of the sensitive information;

determining at least one attribute of the user;

providing information representing the at least one attribute as an input to a hash function;

generating a unique identifier of the user based at least in part on an output received from the hash function in response to the input;

generating a set of text representing the unique identifier of the user;

generating a link to a networked resource, wherein the link comprises the set of text representing the unique identifier of the user;

encoding at least a first bar code with the link;

identifying a document including sensitive information;

steganographically encoding the unique identifier of the user into the document;

causing a display of the document by the second computer system with the unique identifier of the user steganographically encoded into the document;

receiving a request for the networked resource from a third computer system over one or more networks; and determining, based at least in part on the request, that at least one image of at least a portion of the sensitive information was captured by the third computer system.

20. The first computer system of claim 19, wherein the method further comprises:

in response to the request, transmitting an indication that the request has been processed successfully to the third computer system over the one or more networks, wherein the indication comprises at least one of an HTTP Status Code 200 OK or a Domain Name System A record.

\* \* \* \* \*